US012307942B2

(12) United States Patent
In et al.

(10) Patent No.: US 12,307,942 B2
(45) Date of Patent: May 20, 2025

(54) SCAN DRIVER

(71) Applicant: Samsung Display Co., Ltd., Yongin-Si (KR)

(72) Inventors: Hai Jung In, Yongin-si (KR); Min Ku Lee, Yongin-si (KR); Seung Hee Lee, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/662,918

(22) Filed: May 13, 2024

(65) Prior Publication Data

US 2024/0296777 A1 Sep. 5, 2024

Related U.S. Application Data

(63) Continuation of application No. 18/086,648, filed on Dec. 22, 2022, now Pat. No. 11,984,058.

(30) Foreign Application Priority Data

Apr. 8, 2022 (KR) ........................ 10-2022-0044062

(51) Int. Cl.
*G09G 3/20* (2006.01)
*G09G 3/3266* (2016.01)

(52) U.S. Cl.
CPC ......... *G09G 3/2092* (2013.01); *G09G 3/3266* (2013.01); *G09G 2310/0267* (2013.01); *G09G 2310/08* (2013.01); *G09G 2320/0219* (2013.01); *G09G 2330/021* (2013.01)

(58) Field of Classification Search
None
See application file for complete search history.

(56) References Cited

U.S. PATENT DOCUMENTS

| | | | |
|---|---|---|---|
| 7,529,333 | B2 | 5/2009 | Kim et al. |
| 8,830,156 | B2 | 9/2014 | Kim et al. |
| 9,330,593 | B2 | 5/2016 | Jang |
| 9,767,753 | B2 | 9/2017 | Park et al. |
| 10,056,024 | B2 | 8/2018 | Kim et al. |
| 10,217,414 | B2 | 2/2019 | Park et al. |

(Continued)

FOREIGN PATENT DOCUMENTS

| | | | |
|---|---|---|---|
| CN | 111986600 | A | 11/2020 |
| KR | 10-2017-0035404 | A | 3/2017 |

(Continued)

OTHER PUBLICATIONS

A Non-Final Office Action was issued in the cross-referenced U.S. Appl. No. 18/113,538 on Jun. 6, 2024,12 pages.

(Continued)

*Primary Examiner* — Dorothy Harris
(74) *Attorney, Agent, or Firm* — Innovation Counsel LLP

(57) ABSTRACT

A scan driver includes stages that include a first stage. A method for operating the scan driver includes providing a first clock signal, a first carry clock signal, a second carry clock signal, a first power source voltage, and a second power source voltage to the first stage to enable the first stage to provide a first scan signal to a first scan line. Throughout a portion of one frame, each of the first clock signal, the first carry clock signal, and the second carry clock signal is constant.

20 Claims, 17 Drawing Sheets

(56) References Cited

U.S. PATENT DOCUMENTS

| | | | | |
|---|---|---|---|---|
| 10,460,691 | B2 | 10/2019 | Hwang et al. | |
| 10,638,086 | B2 | 4/2020 | Ahn et al. | |
| 10,741,123 | B2 | 8/2020 | Moon et al. | |
| 10,847,082 | B2 | 11/2020 | Kim | |
| 10,923,064 | B2 | 2/2021 | Takeuchi et al. | |
| 11,238,811 | B2 | 2/2022 | Chung et al. | |
| 2008/0049049 | A1 | 2/2008 | Park et al. | |
| 2012/0105398 | A1 | 5/2012 | Park et al. | |
| 2013/0038587 | A1 | 2/2013 | Song et al. | |
| 2014/0146031 | A1 | 5/2014 | Lee et al. | |
| 2015/0187247 | A1 | 7/2015 | Lee et al. | |
| 2017/0084245 | A1* | 3/2017 | Hwang | G09G 3/3696 |
| 2018/0103231 | A1* | 4/2018 | Ahn | G09G 5/005 |
| 2019/0019454 | A1 | 1/2019 | Chen | |
| 2019/0019460 | A1 | 1/2019 | Shi | |
| 2019/0019470 | A1 | 1/2019 | Zeng et al. | |
| 2019/0019474 | A1 | 1/2019 | Jun et al. | |
| 2019/0021151 | A1 | 1/2019 | Kim et al. | |
| 2019/0155433 | A1 | 5/2019 | Park et al. | |
| 2020/0027382 | A1* | 1/2020 | Wang | G11C 19/28 |
| 2020/0243018 | A1 | 7/2020 | Kim et al. | |
| 2020/0320935 | A1 | 10/2020 | Jeon | |
| 2021/0056908 | A1* | 2/2021 | Park | G09G 3/3275 |
| 2021/0056910 | A1* | 2/2021 | Chung | G09G 3/3225 |
| 2021/0201799 | A1* | 7/2021 | Kim | G09G 3/3258 |
| 2022/0101774 | A1* | 3/2022 | Lim | G09G 3/2092 |
| 2022/0157250 | A1* | 5/2022 | Kim | G09G 3/3266 |
| 2022/0206664 | A1 | 6/2022 | Jung et al. | |
| 2023/0008896 | A1* | 1/2023 | Noh | G09G 3/3266 |
| 2023/0105266 | A1* | 4/2023 | Hong | G09G 3/3233 345/212 |
| 2024/0013725 | A1 | 1/2024 | Kim et al. | |
| 2024/0194150 | A1 | 6/2024 | Noh et al. | |

FOREIGN PATENT DOCUMENTS

| | | | |
|---|---|---|---|
| KR | 10-2018-0039232 | A | 4/2018 |
| KR | 10-1980754 | B1 | 5/2019 |
| KR | 10-2020-0049251 | A | 5/2020 |
| KR | 10-2208397 | B1 | 1/2021 |
| KR | 10-2021-0024343 | A | 3/2021 |
| KR | 10-2316983 | B1 | 10/2021 |

OTHER PUBLICATIONS

US Notice of Allowance corresponding to U.S. Appl. No. 18/113,538 and issued on Feb. 21, 2025, 15 pages.

* cited by examiner

<P_ON>

<SSP>

<SSP_1>

<DSP_2>

<SSP_2>

SCAN DRIVER

CROSS-REFERENCE TO RELATED APPLICATION

This application is a continuation application of U.S. patent applicant Ser. No. 18/086,648 filed on Dec. 22, 2022, which claims priority to and the benefit of Korean Patent Application No. 10-2022-0044062 filed in the Korean Intellectual Property Office on Apr. 8, 2022. All the above patent applications are incorporated by reference.

BACKGROUND

(a) Technical Field

The technical field relates to a scan driver and an associated operating method.

(b) Description of the Related Art

A display device includes a data driver for supplying data signals to data lines, a scan driver for supplying scan signals to scan lines, an emission driver for supplying emission control signals to emission control lines, and pixels that are connected to the data lines, the scan lines, and the emission control lines.

The scan driver includes a stage for generating a scan signal. The stage may include transistors and capacitors, and may generate an output signal by shifting an input signal based on clock signals.

SUMMARY

Embodiments may be related to a scan driver and an associated operating method that may minimize power consumption of the scan driver.

Embodiments may be related to a scan driver and an associated operating method that may improve reliability of transistors included in an output circuit of the scan driver.

An embodiment may be related to a scan driver that includes the following elements: stages that supply scan signals to scan lines based on a first clock signal, a first carry clock signal, a second carry clock signal, a first power source, and a second power source. A first stage of the stages may include: a first power input terminal receiving the first power source voltage; a second power input terminal receiving the second power source voltage; a first input terminal receiving the input signal; a second input terminal receiving the first carry clock signal; a third input terminal receiving the second carry clock signal; a fourth input terminal receiving the first clock signal; a first node; an input circuit controlling a voltage of the first node based on the input signal and the first carry clock signal; a first control circuit controlling a voltage of a second node based on the first power source voltage, the second power source voltage, and the voltage of the first node, wherein the second node is included in at least one of the first control circuit and the first stage; a second control circuit controlling a voltage of a third node based on the first power source voltage, the second power source voltage, and the voltage of the first node, wherein the third node is included in at least one of the second control circuit and the first stage; a first output terminal; a first output circuit outputting a first carry signal through the first output terminal based on the voltage of the first node, the voltage of the second node, the voltage of the third node, the second power source voltage, and the second carry clock signal; a second output terminal; and a second output circuit outputting the first scan signal through the second output terminal based on the voltage of the first node, the voltage of the second node, the voltage of the third node, the first power source voltage, and the first clock signal. Throughout at least a portion of one frame, each of the first clock signal, the first carry clock signal, and the second carry clock signal may be constant.

Stages may further include a second stage receiving a second clock signal. The one frame may include a display scan period and a self-scan period;

In the self-scan period, the first carry clock signal and the second carry clock signal may be maintained at a first level; and in the self-scan period, the first clock signal and the second clock signal may be maintained at a second level lower than the first level.

The first stage may further include a first capacitor electrically connected between the first node and the first output terminal.

The input circuit may include a first transistor that is electrically connected between the first input terminal and the first node and include a gate electrode electrically connected to the second input terminal.

The first control circuit may include a second transistor electrically connected between a first control node and the first power input terminal and include a gate electrode electrically connected to the first node, wherein the first control node is included in at least one of the first circuit and the first stage; and a third transistor electrically connected between the second node and the second power input terminal and include a gate electrode electrically connected to the first node.

The first control circuit may further include a second capacitor electrically connected between the first control node and the second node.

The second control circuit may include a fourth transistor electrically connected between a second control node and the first power input terminal and include a gate electrode electrically connected to the first node, wherein the second control node is included in at least one of the second control circuit and the first stage; and a fifth transistor that is connected between the third node and the second power input terminal and include a gate electrode electrically connected to the first node.

The second control circuit may further include a third capacitor electrically connected between the second control node and the third node.

The first output circuit may include a sixth transistor electrically connected between the first node and a third control node and include a gate electrode electrically connected to the third input terminal, wherein the third control node is included in at least one of the first output circuit and the first stage; a seventh transistor electrically connected between the third control node and the first output terminal and include a gate electrode electrically connected to the second node; and an eighth transistor electrically connected between the third control node and the first output terminal and include a gate electrode electrically connected to the third node.

The first output circuit may further include a ninth transistor electrically connected between the third input terminal and the first output terminal and include a gate electrode electrically connected to the first node; a tenth transistor electrically connected between the first output terminal and the second power input terminal and include a gate electrode electrically connected to the second node; and an eleventh transistor electrically connected between the first output terminal and the second power input terminal and include a gate electrode electrically connected to the third node.

The first output circuit may further include a fourth capacitor electrically connected between the first output terminal and the second power input terminal.

The second output circuit may include a twelfth transistor electrically connected between the fourth input terminal and the second output terminal and include a gate electrode electrically connected to the first node; a thirteenth transistor electrically connected between the first power input terminal and the second output terminal and include a gate electrode electrically connected to the second node; and a fourteenth transistor electrically connected between the first power input terminal and the second output terminal and include a gate electrode electrically connected to the third node.

The first stage may further include a fifth input terminal receiving a first node control signal; a sixth input terminal receiving a second node control signal; a third control circuit controlling the voltage of the second node based on the first node control signal; and a fourth control circuit controlling the voltage of the third node based on the second node control signal.

The third control circuit may include a fifteenth transistor electrically connected between the fifth input terminal and a first control node and include a gate electrode thereof is connected to the fifth input terminal; and a sixteenth transistor that is connected between the fifth input terminal and the second node and in which a gate electrode thereof is connected to the first control node.

The fourth control circuit may include a seventeenth transistor electrically connected between the sixth input terminal and a second control node and a gate electrode electrically connected to the sixth input terminal, wherein the second control node is included in at least one of the second control circuit and the first stage; and an eighteenth transistor electrically connected between the sixth input terminal and the third node and including a gate electrode electrically connected to the second control node.

Throughout the one frame, each of the first node control signal and the second node control signal may be constant, wherein a signal level of the first node control signal may be different from a signal level of the second node control signal throughout the one frame.

The Scan driver may receive a second clock signal. The second clock signal may be constant throughout the portion of the one frame. The stages may include a second stage. The second stage may generate a second carry signal and a second scan signal based on the first carry signal, the first carry clock signal, the second carry clock signal, the second clock signal, the first power source voltage, and the second power source voltage.

An embodiment may be related to a scan driver that includes the following elements: stages supplying scan signals to scan lines based on a first clock signal, a second clock signal, a third clock signal, a fourth clock signal, a first carry clock signal, a second carry clock signal, a third carry clock signal, a fourth carry clock signal, a first power source voltage, and a second power source voltage. The first stage may include: a first power input terminal receiving the first power source voltage; a second power input terminal receiving the second power source voltage; a first input terminal receiving the input signal; a second input terminal receiving the first carry clock signal; a third input terminal receiving the third carry clock signal; a fourth input terminal receiving the first clock signal; a first node; an input circuit controlling a voltage of the first node based on the input signal and the first carry clock signal; a first control circuit controlling a voltage of a second node based on the first power source voltage, the second power source voltage, and the voltage of the first node, wherein the second node is included in at least one of the first control circuit and the first stage; a second control circuit controlling a voltage of a third node based on the first power source voltage, the second power source voltage, and the voltage of the first node, wherein the third node is included in at least one of the second control circuit and the first stage; a first output terminal; a first output circuit outputting a first carry signal through the first output terminal based on the voltage of the first node, the voltage of the second node, the voltage of the third node, the second power source voltage, and the third carry clock signal; a second output terminal; and a second output circuit outputting a first scan signal through the second output terminal based on the voltage of the first node, the voltage of the second node, the voltage of the third node, the first power source voltage, and the first clock signal. Throughout at least a portion of one frame, each of the first clock signal, the second clock signal, the third clock signal, the fourth clock signal, the first carry clock signal, the second carry clock signal, the fourth carry clock signal, and the fourth carry clock signal may be constant.

The stages may further include a second stage. The second stage may generate a second carry signal and a second scan signal, based on the input signal, the second carry clock signal, the fourth carry clock signal, the second clock signal, the first power source voltage, and the second power source voltage.

The stages may further include a third stage and a fourth stage. The third stage may generate a third carry signal and a third scan signal, based on the first carry signal, the first carry clock signal, the third carry clock signal, the third clock signal, the first power source voltage, and the second power source voltage. The fourth stage may generate a fourth carry signal and a fourth scan signal, based on the second carry signal, the second carry clock signal, the fourth carry clock signal, the fourth clock signal, the first power source voltage, and the second power source voltage.

An embodiment may be related to a method for operating a scan driver. The scan driver may include stages. The stages may include a first stage. The method may include the following step(s): providing an input signal, a first clock signal, a first carry clock signal, a second carry clock signal, a first power source voltage, and a second power source voltage to the first stage to enable the first stage to provide a first scan signal to a scan line. The first stage may include the following elements: a first power input terminal receiving the first power source voltage; a second power input terminal receiving the second power source voltage; a first input terminal receiving the input signal; a second input terminal receiving the first carry clock signal; a third input terminal receiving the second carry clock signal; a fourth input terminal receiving the first clock signal; a first node; an input circuit controlling a voltage of the first node based on the input signal and the first carry clock signal; a first control circuit controlling a voltage of a second node based on the first power source voltage, the second power source voltage, and the voltage of the first node, wherein the second node may be included in at least one of the first control circuit and the first stage; a second control circuit controlling a voltage of a third node based on the first power source voltage, the second power source voltage, and the voltage of the first node, wherein the third node may be included in at least one of the second control circuit and the first stage; a first output terminal; a first output circuit outputting a first carry signal through the first output terminal based on the voltage of the first node, the voltage of the second node, the voltage of the third node, the second power source voltage, and the second carry clock signal; a second output terminal; and a second output circuit outputting the first scan signal through the second output terminal based on the voltage of the first node, the voltage of the second node, the voltage of the third node, the first power source voltage, and the first clock signal. Throughout at least a portion of one frame, each of the first clock signal, the second clock signal, the first carry clock signal, and the second carry clock signal may be constant.

The method may include the following step: providing a second clock signal to the scan driver to enable the scan driver to provide a second scan signal to a second scan line. The one frame may include a display scan period and a self-scan period. In the self-scan period, the first carry clock signal and the second carry clock signal may be maintained at a first level. in the self-scan period, the first clock signal and the second clock signal may be maintained at a second level lower than the first level.

The first stage may include the following element: a first capacitor electrically connected between the first node and the first output terminal.

The input circuit may include the following element: a first transistor electrically connected between the first input terminal and the first node and including a gate electrode electrically connected to the second input terminal.

The first control circuit may include the following elements: a second transistor electrically connected between a first control node and the first power input terminal and including a gate electrode electrically connected to the first node, wherein the first control node may be included in at least one of the first control circuit and the first stage; and a third transistor electrically connected between the second node and the second power input terminal and including a gate electrode electrically connected to the first node.

The first control circuit may include the following element: a second capacitor electrically connected between the first control node and the second node.

The second control circuit may include the following elements: a fourth transistor electrically connected between a second control node and the first power input terminal and including a gate electrode electrically connected to the first node, wherein the second control node may be included in at least one of the second control circuit and the first stage; and a fifth transistor electrically connected between the third node and the second power input terminal and including a gate electrode electrically connected to the first node.

The second control circuit may include the following element: a third capacitor electrically connected between the second control node and the third node.

The first output circuit may include the following elements: a sixth transistor electrically connected between the first node and a third control node and including a gate electrode electrically connected to the third input terminal, wherein the third control node may be included in at least one of the first output circuit and the first stage; a seventh transistor electrically connected between the third control node and the first output terminal and including a gate electrode electrically connected to the second node; and an eighth transistor electrically connected between the third control node and the first output terminal and including a gate electrode electrically connected to the third node.

The first output circuit may include the following elements: a ninth transistor electrically connected between the third input terminal and the first output terminal and including a gate electrode electrically connected to the first node; a tenth transistor electrically connected between the first output terminal and the second power input terminal and including a gate electrode electrically connected to the second node; and an eleventh transistor electrically connected between the first output terminal and the second power input terminal and including a gate electrode electrically connected to the third node.

The first output circuit may include the following element: a fourth capacitor electrically connected between the first output terminal and the second power input terminal.

The second output circuit may include the following elements: a twelfth transistor electrically connected between the fourth input terminal and the second output terminal and including a gate electrode electrically connected to the first node; a thirteenth transistor electrically connected between the first power input terminal and the second output terminal and including a gate electrode electrically connected to the second node; and a fourteenth transistor electrically connected between the first power input terminal and the second output terminal and including a gate electrode electrically connected to the third node.

The method may include the following step(s): providing a first node control signal and a second node control signal to the first stage. The first stage may include the following elements: a fifth input terminal receiving the first node control signal; a sixth input terminal receiving the second node control signal; a third control circuit controlling the voltage of the second node based on the first node control signal; and a fourth control circuit controlling the voltage of the third node based on the second node control signal.

The third control circuit may include the following elements: a fifteenth transistor electrically connected between the fifth input terminal and a first control node and including a gate electrode electrically connected to the fifth input terminal, wherein the first control node may be included in at least one of the first control circuit and the first stage; and a sixteenth transistor electrically connected between the fifth input terminal and the second node and including a gate electrode electrically connected to the first control node.

The fourth control circuit may include the following elements: a seventeenth transistor electrically connected between the sixth input terminal and a second control node and including a gate electrode electrically connected to the sixth input terminal, wherein the second control node may be included in at least one of the second control circuit and the first stage; and an eighteenth transistor electrically connected between the sixth input terminal and the third node and including a gate electrode electrically connected to the second control node.

Throughout the one frame, each of the first node control signal and the second node control signal may be constant. A signal level of the first node control signal may be different from a signal level of the second node control signal throughout the one frame.

The method may include the following step: providing a second clock signal to the scan driver. The second clock signal may be constant throughout the portion of the one frame. The stages may include a second stage. The second stage may generate a second carry signal and a second scan signal based on the first carry signal, the first carry clock signal, the second carry clock signal, the second clock signal, the first power source voltage, and the second power source voltage.

An embodiment may be related to a method for operating a scan driver. The scan driver may include stages. The stages may include a first stage. The method may include the following step(s): providing a first clock signal, a second clock signal, a third clock signal, a fourth clock signal, a first carry clock signal, a second carry clock signal, a third carry clock signal, a fourth carry clock signal, a first power source voltage, and a second power source voltage to the stages to enable the stages to provide scan signals to scan lines. The first stage may include the following elements: a first power input terminal receiving the first power source voltage; a second power input terminal receiving the second power source voltage; a first input terminal receiving the input signal; a second input terminal receiving the first carry clock signal; a third input terminal receiving the third carry clock signal; a fourth input terminal receiving the first clock signal; a first node; an input circuit controlling a voltage of the first node based on the input signal and the first carry clock signal; a first control circuit controlling a voltage of a second node based on the first power source voltage, the second power source voltage, and the voltage of the first node, wherein the second node may be included in at least one of the first control circuit and the first stage; a second control circuit controlling a voltage of a third node based on the first power source voltage, the second power source voltage, and the voltage of the first node, wherein the third node may be included in at least one of the second control circuit and the first stage; a first output terminal; a first output circuit outputting a first carry signal through the first output terminal based on the voltage of the first node, the voltage of the second node, the voltage of the third node, the second power source voltage, and the third carry clock signal; a second output terminal; and a second output circuit outputting a first scan signal through the second output terminal based on the voltage of the first node, the voltage of the second node, the voltage of the third node, the first power source voltage, and the first clock signal. Throughout at least a portion of one frame, each of the first clock signal, the second clock signal, the third clock signal, the fourth clock signal, the first carry clock signal, the second carry clock signal, the fourth carry clock signal, and the fourth carry clock signal may be constant.

The stages may include a second stage. The second stage may generate a second carry signal and a second scan signal based on the input signal, the second carry clock signal, the fourth carry clock signal, the second clock signal, the first power source voltage, and the second power source voltage.

The stage may include a third stage and a fourth stage. The third stage may generate a third carry signal and a third scan signal based on the first carry signal, the first carry clock signal, the third carry clock signal, the third clock signal, the first power source voltage, and the second power source voltage. The fourth stage may generate a fourth carry signal and a fourth scan signal based on the second carry signal, the second carry clock signal, the fourth carry clock signal, the fourth clock signal, the first power source voltage, and the second power source voltage.

DETAILED DESCRIPTION OF EMBODIMENTS

Figure 1:
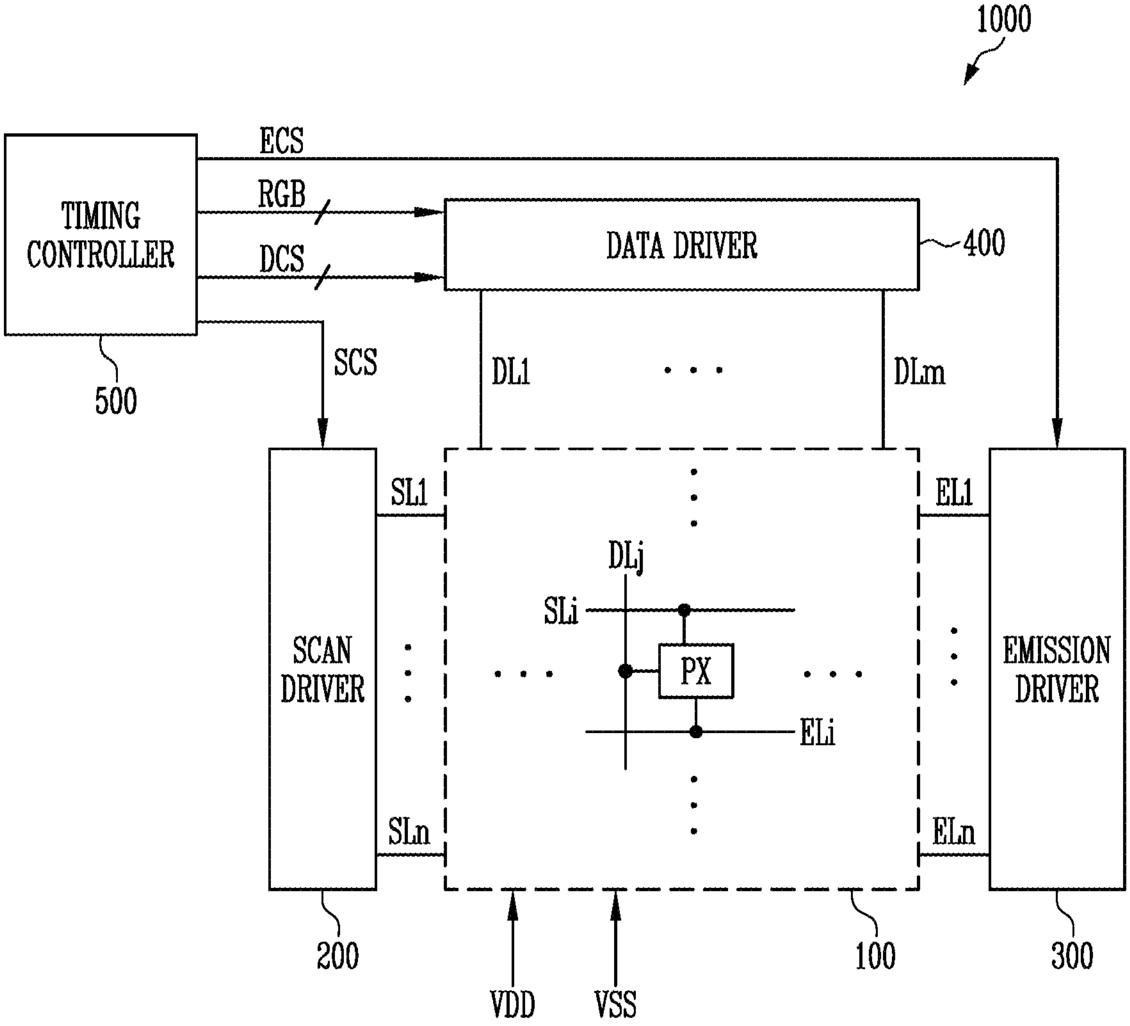
FIG. 1 illustrates a block diagram of a display device according to embodiments.

Examples of embodiments are described with reference to the accompanying drawings. The same reference numerals may be used for the same elements in the drawings.

Although the terms "first," "second," etc. may be used to describe various elements, these elements should not be limited by these terms. These terms may be used to distinguish one element from another element. A first element may be termed a second element without departing from teachings of one or more embodiments. The description of an element as a "first" element may not require or imply the presence of a second element or other elements. The terms "first," "second," etc. may be used to differentiate different categories or sets of elements. For conciseness, the terms "first," "second," etc. may represent "first-category (or first-set)," "second-category (or second-set)," etc., respectively.

The term "connect" may mean "directly connect" or "indirectly connect." The term "connect" may mean "mechanically connect" and/or "electrically connect." The term "connected" may mean "electrically connected" or "electrically connected through no intervening transistor." The term "insulate" may mean "electrically insulate" or "electrically isolate." The term "conductive" may mean "electrically conductive." The term "drive" may mean "operate" or "control." The expression "of A to B" may mean "in a range of A to B." The term "node" may mean "conductive line section." The term "in" or "during" may mean "throughout."

FIG. 1 illustrates a block diagram of a display device according to embodiments.

Referring to FIG. 1, a display device 1000 may include a pixel portion 100, a scan driver 200 (or a first gate driver), an emission driver 300 (or a second gate driver), a data driver 400, and a timing controller 500.

The scan driver 200 and the emission driver 300 may be one component of the gate driver.

The display device 1000 may display an image at various driving frequencies (or image refresh rates, screen refresh rates, etc.) according to driving conditions. The driving frequency is a frequency at which a data signal is substantially written to a driving transistor of a pixel PX. The driving frequency is also referred to as a screen refresh rate, and represent a frequency at which a display screen is played for one second. The display device 1000 may display images in response to various driving frequencies.

An output frequency of the data driver 400 for one horizontal line (or pixel row) and/or an output frequency of the scan driver 200 for outputting a scan signal may be determined in response to the image refresh rate. A refresh rate for driving a moving image may be a frequency of about 60 Hz or more (for example, 80 Hz, 96 Hz, 120 Hz, 240 Hz, and the like).

The display device 1000 may adjust the output frequency of the scan driver 200 for one horizontal line (or pixel row) and the output frequency of the data driver 400 corresponding thereto according to driving conditions. The display device 1000 may display images in response to various image refresh rates of 1 Hz to 240 Hz. The display device 1000 may display an image at an image refresh rate (for example, 480 Hz) of 240 Hz or higher.

The pixel portion 100 may display an image. The pixel portion 100 may include pixels PX connected to data lines DL1 to DLm, scan lines SL1 to SLn, and emission control lines EL1 to ELn. The pixels PX may receive voltages of a first driving power source VDD, a second driving power source VSS, and an initializing power source. A voltage level of the second driving power source VSS may be lower than a voltage level of the first driving power source VDD. A voltage of the first driving power source VDD may be a positive voltage, and a voltage of the second driving power source VSS may be a negative voltage.

The pixels PX may be connected to one or more scan lines SLi and one or more emission control lines ELi corresponding to a pixel circuit structure. The pixel PX may include transistors (including at least one of a driving transistor, an n-type transistor, and a p-type transistor) and a light emitting element.

The timing controller 500 may receive an input control signal and an input image signal from an image source such as an external graphic device. The timing controller 500 may generate image data RGB according to an operating condition of the pixel portion 100 based on the input image signal to provide it to the data driver 400. The timing controller 500 may generate, based on the input control signal, a first control signal SCS for controlling the driving timing of the scan driver 200, a second control signal ECS for controlling the driving timing of the emission driver 300, and a third control signal DCS for controlling the driving timing of the data driver 400 to provide them to the scan driver 200, the emission driver 300, and the data driver 400, respectively.

The scan driver 200 may receive the first control signal SCS from the timing controller 500. The scan driver 200 may supply scan signals to the scan lines SL1 to SLn in response to the first control signal SCS. The first control signal SCS may include a start pulse and clock signals for the scan signal.

The scan driver 200 may supply the scan signals to the scan lines SL1 to SLn at the same frequency (for example, second frequency) as the image refresh rate of the display device 1000. The scan signal may be for writing a data signal to the driving transistor of the pixel PX. The second frequency may be set as a divisor of the first frequency driving the emission driver 300.

The scan driver 200 may supply a scan signal having a gate-on level pulse to the scan lines SL1 to SLn during the display scan period of one frame. The scan driver 200 may supply at least one scan signal to each of the scan lines SL1 to SLn during the display scan period.

The scan driver 200 may supply a scan signal maintained at a gate-off level to the scan lines SL1 to SLn during the self-scan period of one frame.

The scan driver 200 may additionally supply a scan signal for initialization and/or compensation to the pixels PX.

The emission driver 300 may receive the second control signal ECS from the timing controller 500. The emission driver 300 may supply an emission control signal to the emission control lines EL1 to ELn in response to the second control signal ECS. The second control signal ECS may include a start pulse and clock signals for the emission control signal.

The emission driver 300 may supply an emission control signal to the emission control lines EL1 to ELn at the first frequency. The emission driver 300 may always supply the emission control signals to the emission control lines EL1 to ELn at a constant frequency (for example, the first frequency) regardless of the frequency of the image refresh rate. Accordingly, within one frame, the emission control signals supplied to the emission control lines EL1 to ELn may be repeatedly supplied at predetermined intervals.

The first frequency may be set to be greater than the second frequency. The frequency (or the second frequency) of the image refresh rate may be set as a divisor of the first frequency.

At all driving frequencies at which the display device 1000 may be driven, the emission driver 300 may perform scanning once during the display scanning period, and may perform scanning at least once during the self-scan period according to the image refresh rate.

During the display scan period, the emission control signals may be sequentially outputted to the emission control lines EL1 to ELn once. During the self-scan period, the emission control signals may be sequentially outputted to the emission control lines EL1 to ELn one or more times.

Accordingly, when the image refresh rate is reduced, the number of repetitions of the operation of the emission driver 300 supplying the emission control signal to each of the emission control lines EL1 to ELn within one frame may be increased.

The data driver 400 may receive the third control signal DCS from the timing controller 500. The data driver 400 may convert the image data RGB into analog data signals (for example, data voltages) in response to the third control signal DCS, and may supply the data signals to the data lines DL1 to DLm.

In FIG. 1, each of the scan driver 200 and the emission driver 300 is a single unit. The scan driver 200 may include scan drivers each supplying at least one of scan signals of different waveforms. At least one of the scan driver 200 and the emission driver 300 may be integrated into one driving circuit, module, or the like.

The display device 1000 may further include a power supplier. The power supplier may supply a voltage of the first driving power source VDD and a voltage of the second driving power source VSS for driving the pixel PX to the pixel portion 100.

Figure 2:
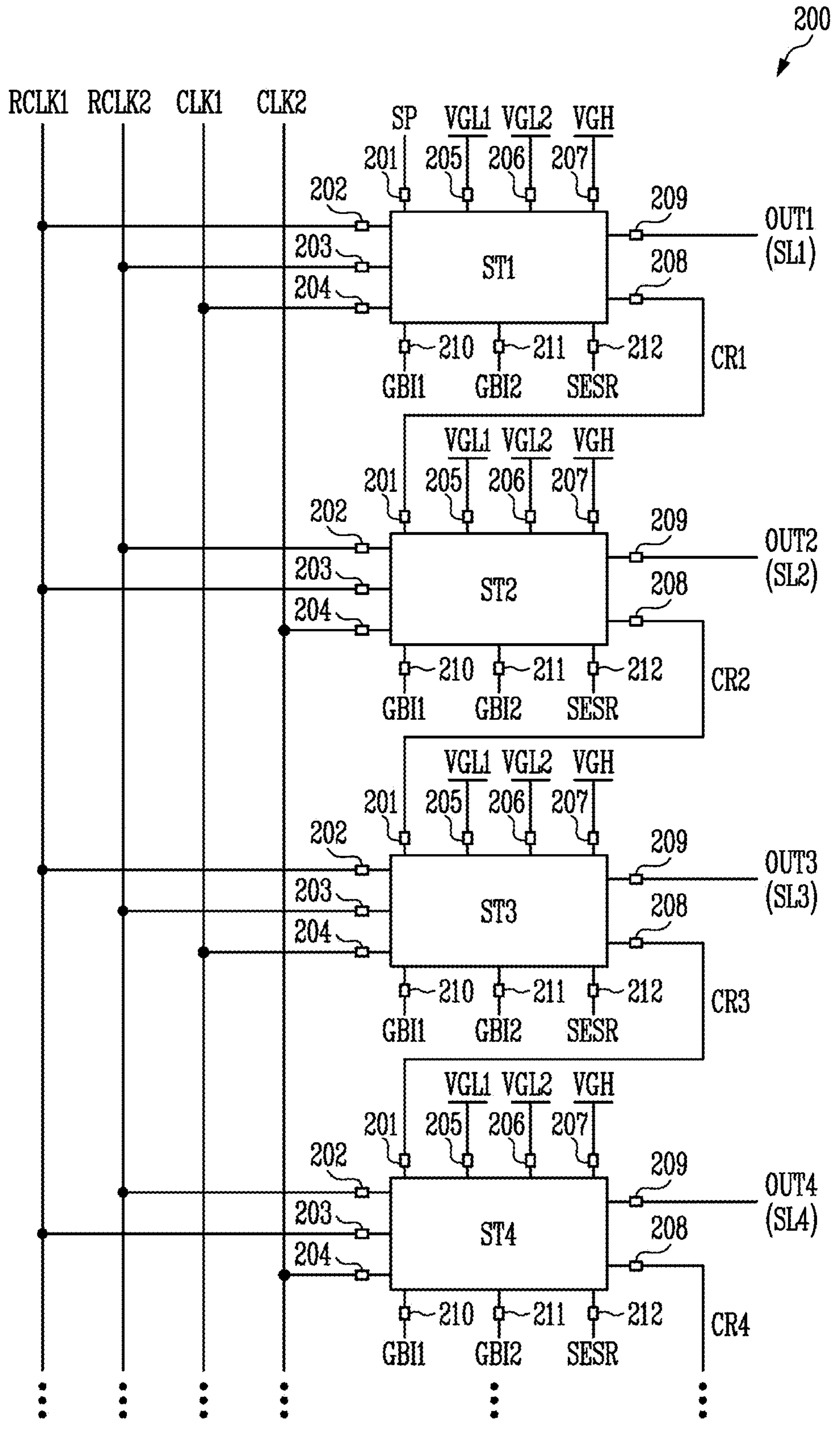
FIG. 2 illustrates a block diagram of a scan driver (a gate driver) according to embodiments.

FIG. 2 illustrates a block diagram of a scan driver (a gate driver) according to embodiments.

FIG. 2 illustrates four stages ST1 to ST4 included in the scan driver 200 and scan signals (or output signals OUT1 to OUT4) outputted from the stages ST1 to ST4.

The scan driver 200 is an example of the gate driver.

Referring to FIG. 2, the scan driver 200 may include the stages (ST1 to ST4). The stages ST1 to ST4 may be respectively connected to the corresponding scan lines SL1 to SL4, and may output scan signals in response to clock signal CLK1 or CLK2 and carry clock signals RCLK1 and RCLK2.

The second stage ST2 may be dependent on the first stage ST1, the third stage ST3 may be dependent on the second stage ST2, and the fourth stage ST4 may be dependent on the third stage ST3. The first to fourth stages ST1 to ST4 may have substantially the same configuration.

Each of the stages ST1 to ST4 may include a first input terminal 201, a second input terminal 202, a third input terminal 203, a fourth input terminal 204, a first power input terminal 205, a second power input terminal 206, a third power input terminal 207, a first output terminal 208, and a second output terminal 209.

Each of the stages ST1 to ST4 may further include a fifth input terminal 210, a sixth input terminal 211, and a seventh input terminal 212.

The first input terminal 201 of the first stage ST1 may receive a start pulse SP. Each of the first input terminals 201 of the second to fourth stages ST2 to ST4 may receive a carry signal (that is, one of the first to third carry signals CR1 to CR3) outputted from the first output terminal 208 of the previous stage. The first input terminal 201 of the second stage ST2 may receive the first carry signal CR1 outputted from the first output terminal 208 of the first stage ST1, the first input terminal 201 of the third stage ST3 may receive the second carry signal CR2 outputted from the first output terminal 208 of the second stage ST2, and the first input terminal 201 of the fourth stage ST4 may receive the third carry signal CR3 outputted from the first output terminal 208 of the third stage ST3.

The first carry clock signal RCLK1 and the second carry clock signal RCLK2 may be alternately provided to the second input terminal 202 and the third input terminal 203 of the stages ST1 to ST4.

The second input terminal 202 of a k-th stage (wherein k is an integer greater than 0) may receive the first carry clock signal RCLK1, and the third input terminal 203 of the k-th stage may receive the second carry clock signal RCLK2. The second input terminal 202 of a (k+1)-th stage may receive the second carry clock signal RCLK2, and the third input terminal 203 of the (k+1)-th stage may receive the first carry clock signal RCLK1.

Each of the second input terminals 202 of the first stage ST1 and the third stage ST3 may receive the first carry clock signal RCLK1, and each of the third input terminals 203 of the first stage ST1 and the third stage ST3 may receive the second carry clock signal RCLK2. Each of the second input terminals 202 of the second stage ST2 and the fourth stage ST4 may receive the second carry clock signal RCLK2, and each of the third input terminals 203 of the second stage ST2 and the fourth stage ST4 may receive the first carry clock signal RCLK1.

In the display scan period, the first carry clock signal RCLK1 and the second carry clock signal RCLK2 may have waveforms having the same period and having phases that do not overlap each other. In the display scan period, the second carry clock signal RCLK2 may be shifted by about half a period from the first carry clock signal RCLK1.

Figure 5A:
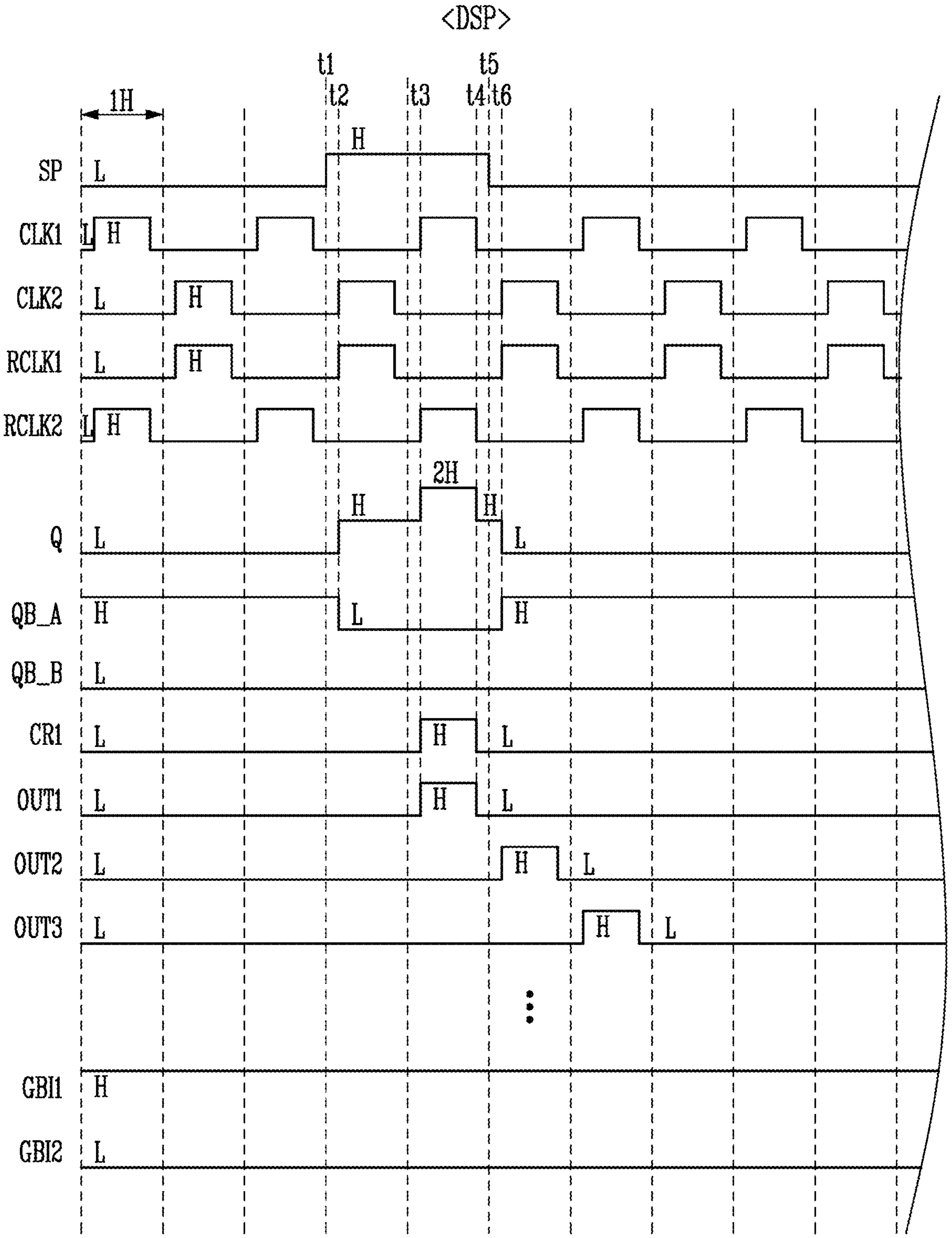
FIG. 5A illustrates a timing diagram of driving of a first stage of FIG. 3 in a display scan period according to embodiments.
Figure 5B:
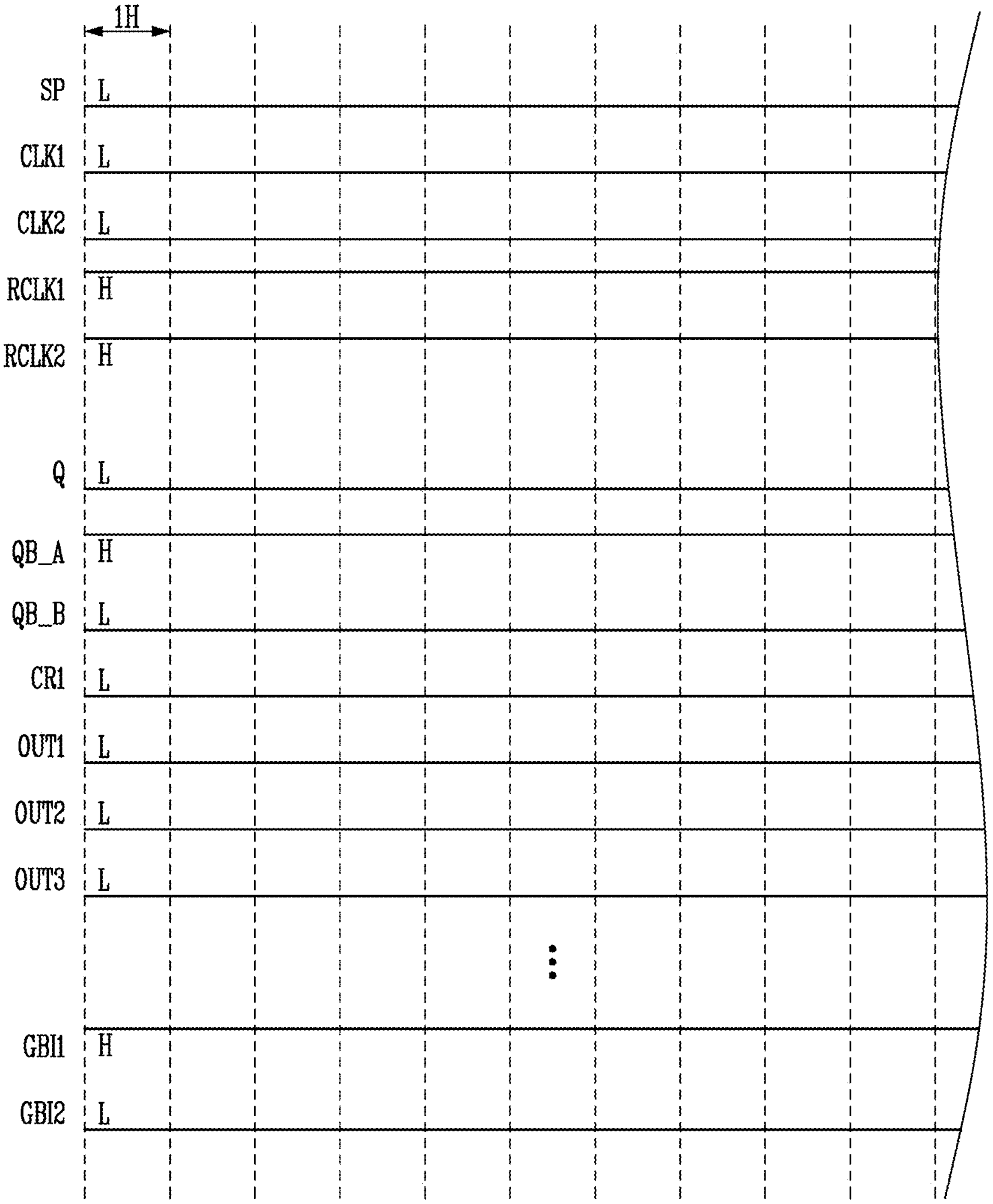
FIG. 5B illustrates a timing diagram of driving of a first stage of FIG. 3 in a self-scan period according to embodiments.

The first carry clock signal RCLK1 and the second carry clock signal RCLK2 may be maintained constant in the self-scan period SSP (see FIG. 5B). For example, in the self-scan period, the first carry clock signal RCLK1 and the second carry clock signal RCLK2 may be maintained at a high level (or a high voltage or a first level).

The first clock signal CLK1 and the second clock signal CLK2 may be alternately provided to the fourth input terminal 204 of the stages ST1 to ST4.

The fourth input terminal 204 of the k-th stage may receive the first clock signal CLK1. The fourth input terminal 204 of the (k+1)-th stage may receive the second clock signal CLK2.

Each of the fourth input terminals 204 of the first stage ST1 and the third stage ST3 may receive the first clock signal CLK1. Each of the fourth input terminals 204 of the second stage ST2 and the fourth stage ST4 may receive the second clock signal CLK2.

In the display scan period, the first clock signal CLK1 and the second clock signal CLK2 may have waveforms having the same period and having phases that do not overlap each other. In the display scan period, the second clock signal CLK2 may be shifted by about half a period from the first clock signal CLK1.

In the self-scan period, the first clock signal CLK1 and the second clock signal CLK2 may be maintained constant. For example, in the self-scan period, the first clock signal CLK1 and the second clock signal CLK2 may be maintained at a low level (or a low voltage or a second level).

As described with reference to FIG. 1, according to the image refresh rate of the display device 1000 (refer to FIG. 1), the scan driver 200 may supply a scan signal having a pulse of a gate-on level (for example, a high level) to the scan lines SL1 to SL4 in a display scan period DSP (refer to FIG. 5A) of one frame, and may supply a scan signal maintained at a gate-off level (for example, a low level) to the scan lines SL1 to SL4 in the self-scan period SSP (refer to FIG. 5B) of one frame. The display device 1000 (refer to FIG. 1) (or the scan driver 200) may maintain the clock signals CLK1 and CLK2 and the carry clock signals RCLK1 and RCLK2 (used to generate the scan signals) at constant levels throughout the self-scan period, in which the scan signals (or output signals) are maintained at the gate-off level (or low level), so that power consumption for transitioning (or clocking) the signal levels of the clock signals CLK1 and CLK2 and the signal levels of the carry clock signals RCLK1 and RCLK2 at a predetermined period may be minimized. This signals are further described with reference to FIG. 3 and FIG. 5A to FIG. 6B.

Voltages of a power source required to drive the stages ST1 to ST4 may be applied to the first to third power input terminals 205, 206, and 207 of the stages ST1 to ST4.

A voltage of a first power source VGL1 may be applied to the first power input terminal 205 of each of the stages ST1 to ST4. A voltage of a second power source VGL2 may be applied to the second power input terminal 206 of each of the stages ST1 to ST4. A voltage of a third power source VGH may be applied to the third power input terminal 207 of each of the stages ST1 to ST4. The voltage of the first power source VGL1, the voltage of the second power source VGL2, and the voltage of the third power source VGH may have a DC voltage level. The voltage level of the third power source VGH may be set higher than the voltage levels of the first power source VGL1 and the second power source VGL2. The voltage level of the second power source VGL2 may be set equal to the voltage level of the first power source VGL1 or lower than the voltage level of the first power source VGL1.

Carry signals CR1 to CR4 may be outputted to the first output terminal 208 of each of the stages ST1 to ST4. Each of the carry signals CR1 to CR4 outputted to the first output terminals 208 may be provided to the first input terminal 201 of the next stage. The first carry signal CR1 outputted from the first output terminal 208 of the first stage ST1 may be provided to the first input terminal 201 of the second stage ST2. The second carry signal CR2 outputted from the first output terminal 208 of the second stage ST2 may be provided to the first input terminal 201 of the third stage ST3. The third carry signal CR3 outputted from the first output terminal 208 of the third stage ST3 may be provided to the first input terminal 201 of the fourth stage ST4. The fourth carry signal CR4 outputted from the first output terminal 208 of the fourth stage ST4 may be provided to the first input terminal of the fifth stage.

The output signals OUT1 to OUT4 may be outputted to the second output terminal 209 of each of the stages ST1 to ST4. The output signals OUT1 to OUT4 outputted to the second output terminals 209 may be provided as scan signals to the corresponding scan lines SL1 to SL4.

For each of the stages ST1 to ST4, a first node control signal GBI1 and a second node control signal GBI2 may be provided to the fifth input terminal 210 and the sixth input terminal 211, respectively.

The first node control signal GBI1 and the second node control signal GBI2 may have opposite signal levels. When the first node control signal GBI1 has a high level, the second node control signal GBI2 may have a low level. When the first node control signal GBI1 has a low level, the second node control signal GBI2 may have a high level. The first node control signal GBI1 and the second node control signal GBI2 may have the same signal level (for example, high level). The first node control signal GBI1 and the second node control signal GBI2 may have opposite signal levels in some periods, and may have the same signal level in some other periods.

The signal level of the first node control signal GBI1 and the signal level of the second node control signal GBI2 may each vary in units of frames. The first node control signal GBI1 may be maintained at the high level for one frame, and the signal level of the first node control signal GBI1 may be changed and transitioned to the low level in a next frame of the corresponding frame. The second node control signal GBI2 may be maintained at the low level for one frame, and the signal level of the second node control signal GBI2 may be changed and transitioned to the high level in a next frame of the corresponding frame. The signal levels of the first node control signal GBI1 and the second node control signal GBI2 may be varied in units of two or more frames. The first node control signal GBI1 and the second node control signal GBI2 are further described with reference to FIG. 3 and FIG. 5A to FIG. 7B.

An initialization control signal SESR may be provided to the seventh input terminal 212 of each of the stages ST1 to ST4. When the display device 1000 (see FIG. 1) (or scan driver 200) is powered-on, the initialization control signal SESR may be provided to the stages ST1 to ST4 through the seventh input terminals 212 at least once, and then may not be provided.

The stages ST1 to ST4 included in the scan driver 200 may have a substantially equivalent configuration, except for a type of a signal received through the first input terminal 201. The first stage ST1 receives the start pulse SP through the first input terminal 201. The remaining stages (for example, the second to fourth stages ST2 to ST4) receive the carry signal of the previous stage through the first input terminal 201. The remaining stages may have substantially the same circuit configuration and operation as the first stage ST1, except for the input signal received through the first input terminal 201.

Accordingly, the first stage ST1 is described as a representative example.

Figure 3:
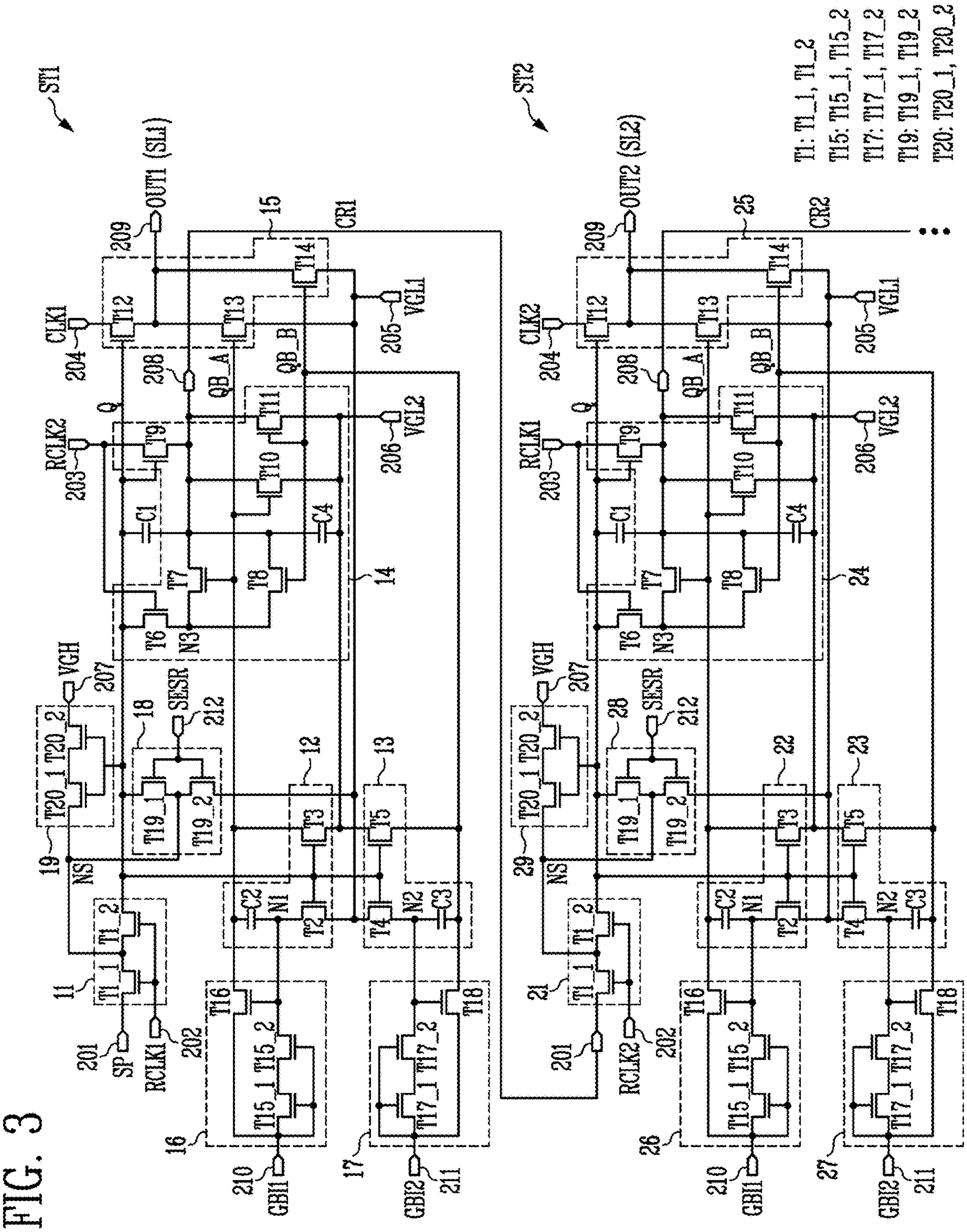
FIG. 3 illustrates a circuit diagram of a first stage and a second stage included in the scan driver of FIG. 2 according to embodiments.

FIG. 3 illustrates a circuit diagram of a first stage and a second stage included in the scan driver of FIG. 2.

Referring to FIG. 2 and FIG. 3, the first stage ST1 may include an input circuit 11, a first control circuit 12, a second control circuit 13, a first output circuit 14 (or a carry signal output circuit), a second output circuit 15 (or a scan signal output circuit), a first capacitor C1 (or a boosting capacitor), a third control circuit 16, and a fourth control circuit 17. The first stage ST1 may further include an initialization circuit 18 and a stabilization circuit 19.

The configuration of the first stage ST1 may also be applied to a j-th stage (wherein j is an integer greater than or equal to 2).

The second stage ST2 may include an input circuit 21, a first control circuit 22, a second control circuit 23, a first output circuit 24, a second output circuit 25, a first capacitor C1, a third control circuit 26, and a fourth control circuit 27. The second stage ST2 may further include an initialization circuit 28 and a stabilization circuit 29.

Except for the configuration in which the input signal provided to the input circuit (for example, the input circuit 21 of the second stage ST2) through the first input terminal (for example, the first input terminal 201 of the second stage ST2) is the carry signal of the (j−1)-th stage (for example, the first carry signal CR1), and the signals applied to the second to fourth input terminals 202, 203, and 204 (the clock signal and the carry clock signal), the j-th stage is substantially the same as or similar to the first stage ST1.

Transistors T1 to T20 included in the first stage ST1 may be n-type transistors. At least some of the transistors T1 to T20 included in the first stage ST1 may be p-type transistors.

The first stage ST1 may generate and output the first carry signal CR1 and the first output signal OUT1 (or the first scan signal) based on the input signal (for example, the start pulse SP), the first carry clock signal RCLK1, the second carry clock signal RCLK2, the first clock signal CLK1, the first node control signal GBI1, the second node control signal GBI2, the voltage of the first power source VGL1, the voltage of the second power source VGL2, and the voltage of the third power source VGH.

As described above with reference to FIG. 2, the voltage level of the third power source VGH may be set higher (for example, set to be a higher voltage) than the voltage levels of the first power source VGL1 and the second power source VGL2. The voltage level of the second power source VGL2 may be set equal to the voltage level of the first power source VGL1 or lower than the voltage level of the first power source VGL1. The voltage level of the first power source VGL1 and the voltage level of the second power source VGL2 may be the same the low voltage.

The first stage ST1 may include the input circuit 11, the first control circuit 12, the second control circuit 13, the first output circuit 14, the second output circuit 15, the first capacitor C1, the third control circuit 16 and the fourth control circuit 17.

The input circuit 11 may receive an input signal (for example, the start pulse SP) through the first input terminal 201, and may receive the first carry clock signal RCLK1 through the second input terminal 202.

The input circuit 11 may control a voltage of a first node Q (or first section Q) based on the start pulse SP and the first carry clock signal RCLK1.

The input circuit 11 may include the first transistor T1.

The first transistor T1 is connected between the first input terminal 201 and the first node Q, and may include a gate electrode connected to the second input terminal 202. The first transistor T1 is turned on when the first carry clock signal RCLK1 supplied through the second input terminal 202 has a gate-on level (for example, a high level), and may electrically connect the first input terminal 201 and the first node Q.

The first transistor T1 may include sub-transistors connected in series. The first transistor T1 may include first and second sub-transistors T1_1 and T1_2 connected in series. Each of the first and second sub-transistors T1_1 and T1_2 may include a gate electrode connected to the second input terminal 202 (in a dual gate structure). Accordingly, current leakage by the first transistor T1 may be minimized.

The first control circuit 12 is connected to the first node Q, may receive the voltage of the first power source VGL1 through the first power input terminal 205, and may receive the voltage of the second power source VGL2 through the second power input terminal 206.

The first control circuit 12 may control a voltage of a second node QB_A based on the voltage of the first node Q, the voltage of the first power source VGL1, and the voltage of the second power source VGL2.

The first control circuit 12 may include the second transistor T2, the third transistor T3, and the second capacitor C2.

The second transistor T2 is connected between a first control node N1 and the first power input terminal 205, and may include a gate electrode connected to the first node Q. The second transistor T2 may be turned on or turned off based on the voltage of the first node Q.

The third transistor T3 is connected between the second node QB_A and the second power input terminal 206, and may include a gate electrode connected to the first node Q. The third transistor T3 may be turned on or turned off based on the voltage of the first node Q. When the third transistor T3 is turned on, the voltage of the second power source VGL2 of a low level may be supplied to the second node QB_A.

The second capacitor C2 may be connected between the second node QB_A and the first control node N1. The second capacitor C2 may include a first electrode connected to the second node QB_A and a second electrode connected to the first control node N1.

When the second transistor T2 is turned on, the first control node N1 and the first power input terminal 205 are electrically connected, so that the voltage of the first power source VGL1, which is a constant voltage, may be supplied to the second electrode of the second capacitor C2 (the first control node N1). Accordingly, the voltage of the low-level second power source VGL2 supplied to the second node QB_A by the third transistor T3 in the turned-on state may be stably maintained by the second capacitor C2.

The second control circuit 13 may control a voltage of a third node QB_B based on the voltage of the first node Q, the voltage of the first power source VGL1, and the voltage of the second power source VGL2.

The second control circuit 13 may include the fourth transistor T4, the fifth transistor T5, and a third capacitor C3.

The fourth transistor T4 is connected between a second control node N2 and the first power input terminal 205, and may include a gate electrode connected to the first node Q. The fourth transistor T4 may be turned on or turned off based on the voltage of the first node Q.

The fifth transistor T5 is connected between the third node QB_B and the second power input terminal 206, and may include a gate electrode connected to the first node Q. The fifth transistor T5 may be turned on or turned off based on the voltage of the first node Q. When the fifth transistor T5 is turned on, the voltage of the second power source VGL2 of a low level may be supplied to the third node QB_B.

The third capacitor C3 may be connected between the third node QB_B and the second control node N2. The third capacitor C3 may include a first electrode connected to the third node QB_B and a second electrode connected to the second control node N2.

On the other hand, when the fourth transistor T4 is turned on, the second control node N2 and the first power input terminal 205 are electrically connected, so that the voltage of the first power source VGL1, which is a constant voltage, may be supplied to the second electrode of the third capacitor C3 (the second control node N2). Accordingly, the voltage of the low-level second power source VGL2 supplied to the third node QB_B by the fifth transistor T5 in the turned-on state may be stably maintained by the third capacitor C3.

The first output circuit 14 is connected to the first node Q, the second node QB_A, and the third node QB_B, and it may receive the second carry clock signal RCLK2 through the third input terminal 203 and may receive the voltage of the second power source VGL2 through the second power input terminal 206.

The first output circuit 14 may output the first carry signal CR1, based on the voltage of the first node Q, the voltage of the second node QB_A, the voltage of the third node QB_B, the second carry clock signal RCLK2, and the voltage of the second power source VGL2. The high level of the second carry clock signal RCLK2 may correspond to the high level of the first carry signal CR1, and the voltage of the second power source VGL2 may correspond to the low level of the first carry signal CR1. On the other hand, as described above with reference to FIG. 2, the first carry signal CR1 may be provided to a next stage (for example, the second stage ST2) through the first output terminal 208.

The first output circuit 14 may include the sixth to eleventh transistors T6 to T11 and a fourth capacitor C4.

The sixth transistor T6 is connected between the first node Q and the third control node N3, and may include a gate electrode connected to the third input terminal 203. The sixth transistor T6 is turned on when the second carry clock signal RCLK2 supplied through the third input terminal 203 has a gate-on level (for example, a high level), so that it may electrically connect the first node Q and the third control node N3.

The seventh transistor T7 is connected between the third control node N3 and the first output terminal 208, and may include a gate electrode connected to the second node QB_A. The seventh transistor T7 may be turned on or turned off based on the voltage of the second node QB_A.

The eighth transistor T8 is connected between the third control node N3 and the first output terminal 208, and may include a gate electrode connected to the third node QB_B. The eighth transistor T8 may be turned on or turned off based on the voltage of the third node QB_B.

The ninth transistor T9 is connected between the third input terminal 203 and the first output terminal 208, and may include a gate electrode connected to the first node Q. The ninth transistor T9 may be turned on or turned off based on the voltage of the first node Q. When the ninth transistor T9 is turned on, the third input terminal 203 and the first output terminal 208 may be electrically connected. When the ninth transistor T9 is turned on and when the second carry clock signal RCLK2 supplied through the third input terminal 203 has a high level, the high level of the second carry clock signal RCLK2 may correspond to the high level of the first carry signal CR1.

The tenth transistor T10 is connected between the second power input terminal 206 and the first output terminal 208, and may include a gate electrode connected to the second node QB_A. The tenth transistor T10 may be turned on or turned off based on the voltage of the second node QB_A. When the tenth transistor T10 is turned on, the second power input terminal 206 and the first output terminal 208 may be electrically connected. When the tenth transistor T10 is turned on, the voltage of the second power source VGL2 supplied through the second power input terminal 206 may correspond to the low level of the first carry signal CR1.

The eleventh transistor T11 is connected between the second power input terminal 206 and the first output terminal 208, and may include a gate electrode connected to the third node QB_B. The eleventh transistor T11 may be turned on or turned off based on the voltage of the third node QB_B. When the eleventh transistor T11 is turned on, the second power input terminal 206 and the first output terminal 208 may be electrically connected. When the eleventh transistor T11 is turned on, the voltage of the second power source VGL2 supplied through the second power input terminal 206 may correspond to the low level of the first carry signal CR1.

The ninth transistor T9 of the first output circuit 14 performs a pull-up function for outputting the first carry signal CR1, and the tenth and eleventh transistors T10 and T11 perform a pull-down function for outputting the first carry signal CR1.

The fourth capacitor C4 may be connected between the first output terminal 208 and the second power input terminal 206. The fourth capacitor C4 may include a first electrode connected to the second power input terminal 206 and a second electrode connected to the first output terminal 208. Here, since the first electrode of the fourth capacitor C4 is connected to the second power input terminal 206 to which the second power source VGL2, which is a constant voltage, is supplied, the voltage of the node corresponding to the first output terminal 208 may be stably maintained.

The second output circuit 15 is connected to the first node Q, the second node QB_A, and the third node QB_B, and it may receive the first clock signal CLK1 through the fourth input terminal 204 and may receive the voltage of the first power source VGL1 through the first power input terminal 205.

The second output circuit 15 may output the first output signal OUT1 (or the first scan signal), based on the voltage of the first node Q, the voltage of the second node QB_A, the voltage of the third node QB_B, the first clock signal CLK1, and the voltage of the first power source VGL1. The high level of the first clock signal CLK1 may correspond to the high level of the first output signal OUT1, and the voltage of the first power source VGL1 may correspond to the low level of the first output signal OUT1. The first output signal OUT1 may be provided to the first scan line SL1 through the second output terminal 209 as a scan signal.

The second output circuit 15 may include the twelve to fourteenth transistors T12 to T14.

The twelve transistor T12 is connected between the fourth input terminal 204 and the second output terminal 209, and may include a gate electrode connected to the first node Q. The twelve transistor T12 may be turned on or turned off based on the voltage of the first node Q. When the twelfth transistor T12 is turned on, the fourth input terminal 204 and the second output terminal 209 may be electrically connected. When the first clock signal CLK1 supplied through the fourth input terminal 204 has a high level when the twelfth transistor T12 is turned on, the high level of the first clock signal CLK1 may correspond to the high level of the first output signal OUT1.

The thirteenth transistor T13 is connected between the first power input terminal 205 and the second output terminal 209, and may include a gate electrode connected to the second node QB_A. The thirteenth transistor T13 may be turned on or off based on the voltage of the second node QB_A. When the thirteenth transistor T13 is turned on, the first power input terminal 205 and the second output terminal 209 may be electrically connected. When the thirteenth transistor T13 is turned on, the voltage of the first power source VGL1 supplied through the first power input terminal 205 may correspond to the low level of the first output signal OUT1.

The fourteenth transistor T14 is connected between the first power input terminal 205 and the second output terminal 209, and may include a gate electrode connected to the third node QB_B. The fourteenth transistor T14 may be turned on or off based on the voltage of the third node QB_B. When the fourteenth transistor T14 is turned on, the first power input terminal 205 and the second output terminal 209 may be electrically connected. When the fourteenth transistor T14 is turned on, the voltage of the first power source VGL1 supplied through the first power input terminal 205 may correspond to the low level of the first output signal OUT1.

The twelfth transistor T12 of the second output circuit 15 performs a pull-up function for outputting the first output signal OUT1, and the thirteenth and fourteenth transistors T13 and T14 perform a pull-down function for outputting the first output signal OUT1.

The first capacitor C1 may be connected between the first node Q and the first output terminal 208. The first capacitor C1 may include a first electrode connected to the first node Q and a second electrode connected to the first output terminal 208.

The third control circuit 16 is connected to the first control node N1, and may receive the first node control signal GBI1 through the fifth input terminal 210.

The third control circuit 16 may control the voltage of the second node QB_A based on the first node control signal GBI1.

The third control circuit 16 may include the fifteenth transistor T15 and the sixteenth transistor T16.

The fifteenth transistor T15 is connected between the fifth input terminal 210 and the first control node N1, and may include a gate electrode connected to the fifth input terminal 210. The fifteenth transistor T15 may be turned on when the first node control signal GBI1 supplied through the fifth input terminal 210 has a gate-on level (for example, a high level) to electrically connect the fifth input terminal 210 and the first control node N1.

The fifteenth transistor T15 may include sub-transistors connected in series. The fifteenth transistor T15 may include third and fourth sub-transistors T15_1 and T15_2 connected in series. Each of the third and fourth sub-transistors T15_1 and T15_2 may include a gate electrode connected to the fifth input terminal 210 (in a dual gate structure). Accordingly, current leakage by the fifteenth transistor T15 may be minimized.

The sixteenth transistor T16 is connected between the fifth input terminal 210 and the second node QB_A, and may include a gate electrode connected to the first control node N1. The sixteenth transistor T16 may be turned on or turned off based on the voltage of the first control node N1.

The fourth control circuit 17 is connected to the second control node N2, and may receive the second node control signal GBI2 through the sixth input terminal 211.

The fourth control circuit 17 may control the voltage of the third node QB_B based on the second node control signal GBI2.

The fourth control circuit 17 may include the seventeenth transistor T17 and the eighteenth transistor T18.

The seventeenth transistor T17 is connected between the sixth input terminal 211 and the second control node N2, and may include a gate electrode connected to the sixth input terminal 211. The seventeenth transistor T17 may be turned on when the second node control signal GBI2 supplied through the sixth input terminal 211 has a gate-on level (for example, a high level) to electrically connect the sixth input terminal 211 and the second control node N2.

The seventeenth transistor T17 may include sub-transistors connected in series. The seventeenth transistor T17 may include fifth and sixth sub-transistors T17_1 and T17_2 connected in series. Each of the fifth and sixth sub-transistors T17_1 and T17_2 may include a gate electrode connected to the sixth input terminal 211 (in a dual gate structure). Accordingly, current leakage by the seventeenth transistor T17 may be minimized.

The eighteenth transistor T18 is connected between the sixth input terminal 211 and the third node QB_B, and may include a gate electrode connected to the second control node N2. The eighteenth transistor T18 may be turned on or turned off based on the voltage of the second control node N2.

The first stage ST1 may further include the initialization circuit 18 and the stabilization circuit 19.

The initialization circuit 18 may receive the voltage of the first power source VGL1 through the first power input terminal 205, and may receive the initialization control signal SESR through the seventh input terminal 212.

The initialization circuit 18 may control the voltage of the first node Q based on the initialization control signal SESR and the voltage of the first power source VGL1. In order to discharge a voltage remaining in the first node Q (for example, a parasitic capacitor connected to the first node Q and the like) during power-on, the initialization circuit 18 may supply the low voltage of the first power source VGL1 to the first node Q at least once during power-on.

The initialization circuit 18 may include the nineteenth transistor T19.

The nineteenth transistor T19 is connected between the first power input terminal 205 and the first node Q, and may include a gate electrode connected to the seventh input terminal 212. The nineteenth transistor T19 may be turned on when the initialization control signal SESR supplied through the seventh input terminal 212 has a gate-on level (for example, a high level), so that the low voltage of the first power source VGL1 supplied through the first power input terminal 205 may be provided to the first node Q.

The nineteenth transistor T19 may include sub-transistors connected in series. The nineteenth transistor T19 may include seventh and eighth sub-transistors T19_1 and T19_2 connected in series. Each of the seventh and eighth sub-transistors T19_1 and T19_2 may include a gate electrode connected to the seventh input terminal 212 (in a dual gate structure). Accordingly, current leakage by the nineteenth transistor T19 may be minimized.

A specific operation of the initialization circuit 18 (or the nineteenth transistor T19) is described with reference to FIG. 4.

The stabilization circuit 19 is connected to the first node Q, and may receive the voltage of the third power source VGH through the third power input terminal 207.

The stabilization circuit 19 may stabilize the node between the sub-transistors (for example, the first and second sub-transistors T1_1 and T1_2) included in the first transistor T1 and the node between the sub-transistors (for example, the seventh and eighth sub-transistors T19_1 and T19_2) included in the nineteenth transistor T19, based on the voltage of the first node Q and the voltage of the third power source VGH.

The stabilization circuit 19 may include the twentieth transistor T20.

The twentieth transistor T20 is connected between the third power input terminal 207 and a stabilization node NS, and may include a gate electrode connected to the first node Q. The stabilization node NS may correspond to the node between the sub-transistors (for example, the first and second sub-transistors T1_1 and T1_2) included in the first transistor T1 and the node between the sub-transistors (for example, the seventh and eighth sub-transistors T19_1 and T19_2) included in the nineteenth transistor T19.

The twentieth transistor T20 may be turned on or turned off based on the voltage of the first node Q. The case in which the twentieth transistor T20 is turned on corresponds to the case in which the voltage of the first node Q is the high level (or the high voltage), so that the twentieth transistor T20 applies the high voltage of the third power source VGH to the node between the sub-transistors (for example, the first and second sub-transistors T1_1 and T1_2) included in the first transistor T1 and the node (the stabilization node NS) between the sub-transistors (for example, the seventh and eighth sub-transistors T19_1 and T19_2) included in the nineteenth transistor T19, it is possible to stably maintain the voltage of the first node Q at a high level (or a high voltage).

The twentieth transistor T20 may include sub-transistors connected in series. The twentieth transistor T20 may include ninth and tenth sub-transistors T20_1 and T20_2 connected in series. Each of the ninth and tenth sub-transistors T20_1 and T20_2 may include a gate electrode connected to the first node Q.

The configuration of the stabilization circuit 19 may be optional. For example, when the first transistor T1 and the nineteenth transistor T19 do not include the sub-transistors and are each implemented as a single transistor, the configuration of the stabilization circuit 19 may be optional.

The carry signal (for example, the first carry signal CR1) and the output signal (for example, the first output signal OUT1) may each have a signal form having a high level pulse in the self-scan period of one frame. The first carry signal CR1 and the first output signal OUT1 may have a signal form maintaining a low level during most of the self-scan period except for a period having a high-level pulse.

In the period in which the first carry signal CR1 is maintained at the low level, at least one of the tenth transistor T10 and the eleventh transistor T11 performing the pull-down function of the first output circuit 14 maintains the turn-on state, so that the second power source VGL2 of the low level (or the low voltage) may be outputted as the first carry signal CR1 through the first output terminal 208. In the period in which the first output signal OUT1 is maintained at the low level, at least one of the thirteenth transistor T13 and the fourteenth transistor T14 performing the pull-down function of the second output circuit 15 maintains the turn-on state, so that the first power source VGL1 of the low level (or, the low voltage) may be outputted to the first scan line SL1 through the second output terminal 209 as the first output signal OUT1.

If the tenth and eleventh transistors T10 and T11 of the first output circuit 14 and the thirteenth and fourteenth transistors T13 and T14 of the second output circuit 15 are all maintained in the turned-on state (that is, if the voltages of the second node QB_A and the third node QB_B are both maintained at a high voltage (a high level)), a high voltage is continuously applied to the gate electrode of each of the tenth and eleventh transistors T10 and T11 and the thirteenth and fourteenth transistors T13 and T14. Since all of the tenth and eleventh transistors T10 and T11 and the thirteenth and fourteenth transistors T13 and T14 are n-type transistors (for example, transistors in which channels are oxide semiconductors), due to the continuously applied high voltage, threshold voltages (Vth) of the tenth and eleventh transistors T10 and T11 and the thirteenth and fourteenth transistors T13 and T14 are shifted in a positive direction, so reliability may be unsatisfactory.

As described above with reference to FIG. 2, the first node control signal GBI1 and the second node control signal GBI2 may have opposite signal levels in at least some periods, and each of the signal level of the first node control signal GBI1 and the signal level of the second node control signal GBI2 may vary in units of frames (for example, in units of one frame, units of two frames, or the like). As the first node control signal GBI1 and the second node control signal GBI2 having opposite signal levels vary in frame units, corresponding to a period in which the signal level of each of the output signal (for example, the first output signal OUT1) and the carry signal (for example, the first carry signal CR1) is maintained at a low level, only some of the transistors performing the pull-down function of each of the first output circuit 14 and the second output circuit 15 may be maintained in the turned-on state, while the remaining transistors may be maintained in the turned-off state. For example, only the tenth and thirteenth transistors T10 and T13 may be maintained in the turned-on state, and the eleventh and fourteenth transistors T11 and T14 may be maintained in the turned-off state; and/or only the eleventh and fourteenth transistors T11 and T14 may be maintained in the turned-on state, and the tenth and thirteenth transistors T10 and T13 may be maintained in the turned-off state.

The scan driver 200 (or the display device 1000 (see FIG. 1)) may separately drive the transistors performing the pull-down function of each of the first output circuit 14 and the second output circuit 15 in units of frames.

The scan driver 200 (or the display device 1000 (see FIG. 1)) maintains only some of the transistors performing the pull-down function of each of the first output circuit 14 and the second output circuit 15 in the turned-on state, so that reliability of the transistors (the transistors performing the pull-down function) included in the output circuits 14 and 15 of each stage may be satisfactory.

An operation of the scan driver 200 (or the stages ST1 to ST4) is described with reference to FIG. 5A to FIG. 7B.

Figure 4:
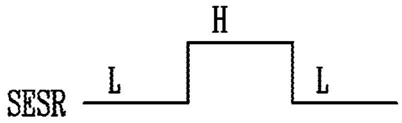
FIG. 4 illustrates a timing diagram of driving the scan driver of FIG. 2 during power-on according to embodiments.

FIG. 4 illustrates a timing diagram of driving the scan driver of FIG. 2 during power-on.

Referring to FIG. 2 to FIG. 4, the initialization control signal SESR may have a pulse of a high level H when the scan driver 200 (or the display device 1000 (see FIG. 1)) is powered on (P_ON).

The high level H (or high voltage) shown in FIG. 4 may correspond to the voltage of the third power source VGH, and a low level L (or low voltage) shown in FIG. 4 may correspond to the voltage of the first power source VGL1 (or the voltage of the second power source VGL2).

When the initialization control signal SESR is at the high level H, the nineteenth transistor T19 may be turned on. When the nineteenth transistor T19 is turned on, the voltage of the first power source VGL1 of the low level L may be applied to the first node Q. As a result, the voltage remaining in the first node Q (for example, a parasitic capacitor connected to the first node Q) may be discharged by the voltage of the low level L. Accordingly, it can be possible to prevent the twelfth transistor T12 from being turned on by the remaining voltage of the first node Q. An unintended output signal (for example, the first output signal OUT1) may be prevented to be outputted through a scan line (for example, the first scan line SL1).

The initialization control signal SESR may be maintained at the low level L after having the pulse of the high level H in response to the power-on (P_ON) of the scan driver 200.

FIG. 5A illustrates a timing diagram of driving of the first stage of FIG. 3 in the display scan period. FIG. 5B illustrates a timing diagram of driving of the first stage of FIG. 3 in the self-scan period.

Referring to FIG. 1 to FIG. 3, FIG. 5A, and FIG. 5B, FIG. 5A and FIG. 5B illustrate scan signals (or output signals OUT1, OUT2, OUT3, etc.) outputted through the scan lines SL1 to SLn and supplied to the pixels PX. As described above with reference to FIG. 1, the scan driver 200 may supply a scan signal including a gate-on level pulse to the scan lines SL1 to SLn in the display scan period DSP of one frame.

In the display scan period DSP of one frame, the pixels PX may be supplied with signals for displaying an image. For example, in the display scan period DSP of one frame, based on the scan signals (or the output signals OUT1, OUT2, OUT3, etc.) supplied to the pixels PX through the scan lines SL1 to SLn, a transistor (for example, a scan transistor) included in each of the pixels PX and receiving a scan signal is turned on, so that a data signal may be written into a driving transistor of each of the pixels PX.

The scan driver 200 may supply a scan signal maintained at a gate-off level to the scan lines SL1 to SLn during the self-scan period SSP of one frame.

The high level H (or high voltage) shown may correspond to the voltage of the third power source VGH, and a low level L (or low voltage) may correspond to the voltage of the first power source VGL1 (or the voltage of the second power source VGL2). The voltage of the third power source VGH may be a positive voltage, and the voltage of the first power source VGL1 (or the voltage of the second power source VGL2) may be a negative voltage. The high level H and the low level L are not limited thereto. The voltage of the high level H and the voltage of the low level L may be set according to the type of transistor, the use environment of the display device, and the like.

During the corresponding frame (for example, the display scan period DSP and the self-scan period SSP), the first node control signal GBI1 may be maintained at the high level H, and the second node control signal GBI2 may be maintained at the low level L. The first node control signal GBI1 and the second node control signal GBI2 may have opposite signal levels. For example, during the corresponding frame (for example, the display scan period DSP and the self-scan period SSP), the first node control signal GBI1 may be maintained at the low level L, and the second node control signal GBI2 may be maintained at the high level H.

Figure 6A:
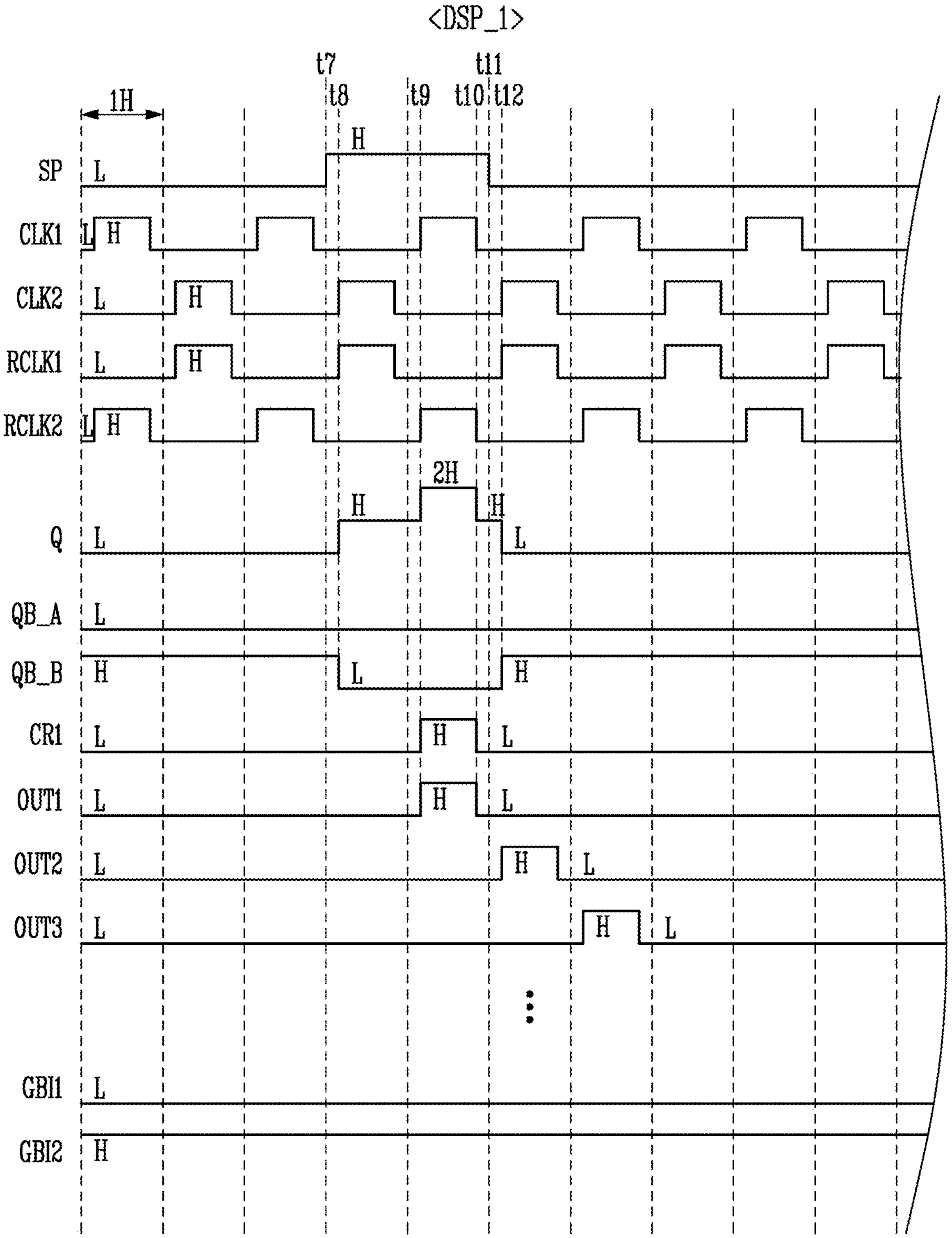
FIG. 6A illustrates a timing diagram of driving of a first stage of FIG. 3 in a display scan period according to embodiments.
Figure 6B:
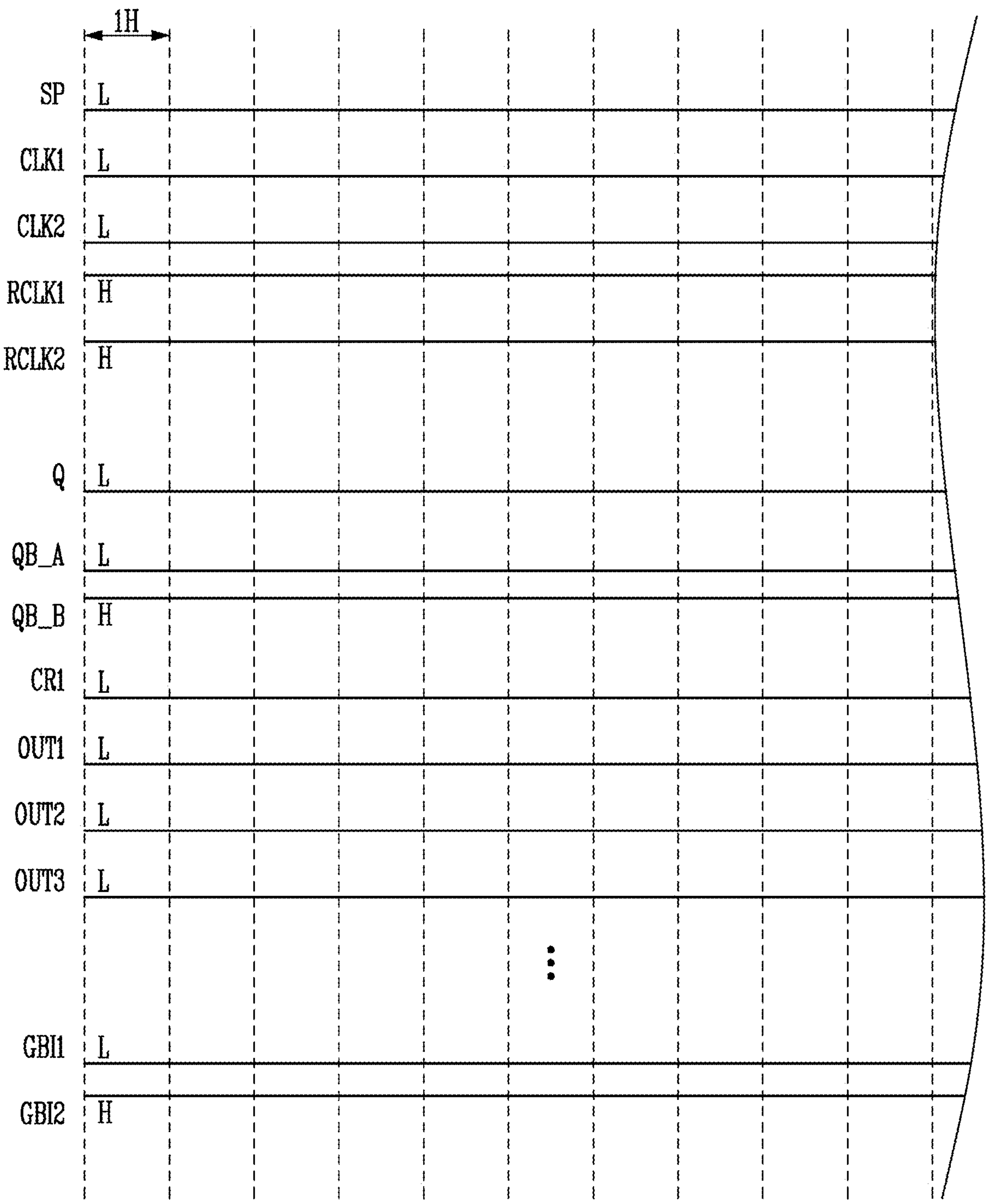
FIG. 6B illustrates a timing diagram of driving of a first stage of FIG. 3 in a self-scan period according to embodiments.

In FIG. 5A and FIG. 5B, the first node control signal GBI1 is maintained at the high level H, and the second node control signal GBI2 is maintained at the low level L. In FIG. 6A and FIG. 6B, the first node control signal GBI1 is maintained at the low level L, and the second node control signal GBI2 is maintained at the high level L.

Regarding the operation of the first stage ST1 included in the scan driver 200 in the display scan period DSP, referring to FIG. 1 to FIG. 3 and FIG. 5A, in the display scan period DSP of one frame, the first clock signal CLK1 and the second clock signal CLK2 may be supplied at different timings. The second clock signal CLK2 may be shifted by a half period (for example, one horizontal period 1H) from the first clock signal CLK1.

In the display scan period DSP of one frame, the first carry clock signal RCLK1 and the second carry clock signal RCLK2 may be supplied at different times. The second carry clock signal RCLK2 may be shifted by a half period (for example, one horizontal period 1H) from the first carry clock signal RCLK1.

In a period from a first time point t1 to a fifth time point t5, the start pulse SP may have the high level H. In a period before the first time point t1 and a period after the fifth time point t5, the start pulse SP may have the low level L.

In a period before the first time point t1, the voltage of the first node Q may be at the low level L. At a time point at which the first carry clock signal RCLK1 is at the high level H during the period before the first time point t1, as the first transistor T1 is turned on, the start pulse SP of the low level L is provided to the first node Q, so that the voltage of the first node Q may be changed to the low level L (or the voltage of the first node Q is maintained at the low level L). Accordingly, in the period before the first time point t1, the second to fifth transistors T2 to T5 may be maintained in the turn-off state.

Since the first node control signal GBI1 is maintained at the high level H, the fifteenth transistor T15 may be turned on or maintained in a turned-on state. Accordingly, the first node control signal GBI1 of the high level H is provided to the first control node N1, so that the sixteenth transistor T16 may be turned on or maintained in a turned-on state. Since the first node control signal GBI1 of the high level H is provided to the second node QB_A, the voltage of the second node QB_A may have the high level H in a period before the first time point t1.

Unlike the first node control signal GBI1, since the second node control signal GBI2 is maintained at the low level L, the seventeenth transistor T17 and the eighteenth transistor T18 may be turned off or maintained in a turned-off state. Accordingly, the third node QB_B may be maintained at the low level L.

At the first time point t1, the start pulse SP supplied through the first input terminal 201 may transition from the low level L to the high level H.

At the second time point t2, since the first carry clock signal RCLK1 of the high level H (or gate-on level) is supplied through the second input terminal 202, the first transistor T1 may be turned on.

When the first transistor T1 is turned on, the high level H of the start pulse SP may be supplied to the first node Q. Accordingly, the voltage of the first node Q may transition from the low level L to the high level H.

The second to fifth transistors T2 to T5 may be turned on by the voltage of the high level H of the first node Q.

When the third transistor T3 is turned on, the voltage of the second power source VGL2 having the low level L is supplied to the second node QB_A, and accordingly, the voltage of the second node QB_A may transition from the high level H to the low level L.

As described above with reference to FIG. 3, when the second transistor T2 is turned on, the voltage of the second power source VGL2, which is a constant voltage, is supplied to the first control node N1, so that the voltage of the second node QB_A may be stably maintained at the low level L by the second capacitor C2.

Since the second transistor T2 is turned on, the voltage of the first power source VGL1 of the low level L is supplied to the first control node N1, so that the sixteenth transistor T16 may be turned off or maintained in the turned-off state.

Since the first node control signal GBI1 is maintained at the high level H, the voltage of the first power source VGL1 of the low level L and the first node control signal GBI1 of the high level H may be supplied to the first control node N1 by the turned-on fifteenth transistor T15. The first node control signal GBI1 is a signal whose signal level is variable, while the voltage of the first power source VGL1 corresponds to a constant voltage supplied from a constant voltage source, so the voltage level of the first power source VGL1 may be maintained more stable than the signal level of the first node control signal GBI1. Accordingly, even if the first node control signal GBI1 is supplied to the first control node N1, the first control node N1 may be stably maintained at the low level L by the voltage of the first power source VGL1 of the low level L supplied through the turned-on second transistor T2.

The ninth transistor T9 and the twelfth transistor T12 may be turned on by the voltage of the high level H of the first node Q. At the second time point t2, both of the second carry clock signal RCLK2 and the first clock signal CLK1 have the low level L, so that both of the first carry signal CR1 outputted through the first output terminal 208 and the first output signal OUT1 outputted through the second output terminal 209 may have the low level L.

The voltage of the first node Q has the high level H, and the voltage of the node corresponding to the first output terminal 208 has the low level L, so that the first capacitor C1 may store a voltage corresponding to a difference (a voltage difference) between the voltage of the high level H and the voltage of the low level L.

At the third time point t3, the second carry clock signal RCLK2 of the high level H may be supplied through the third input terminal 203, and the first clock signal CLK1 of the high level H may be supplied through the fourth input terminal 204.

The ninth transistor T9 and the twelfth transistor T12 may be turned on or maintained in the turned-on state by the voltage of the first node Q of the high level H.

Since the ninth transistor T9 is turned on or maintained in the turned-on state, the second carry clock signal RCLK2 of the high level H is supplied to the first output terminal 208, so that the first carry signal CR1 may be outputted at the high level H.

Since the twelfth transistor T12 is turned on or maintained in the turned-on state, the first clock signal CLK1 of the high level H is supplied to the second output terminal 209, so that the first output signal OUT1 may be outputted at the high level H.

The voltage of the node connected to the second electrode of the first capacitor C1 and corresponding to the first output terminal 208 may be changed from the existing low level L to the high level H. Therefore, the voltage of the first node Q may be increased from the existing high level H to 2-high level 2H by the coupling of the first capacitor C1. Accordingly, the ninth transistor T9 and the twelfth transistor T12 may be stably maintained in the turned-on state.

The 2-high level 2H may correspond to a voltage level in which a voltage change amount of the node corresponding to the first output terminal 208 by the coupling of the first capacitor C1 is reflected in the voltage of the first node Q. The 2-high level 2H may correspond to a value obtained by adding a voltage change amount (that is, a difference between the high level H and the low level L) of a node corresponding to the first output terminal 208 at the high level H.

At the fourth time point t4, the second carry clock signal RCLK2 of the low level L may be supplied through the third input terminal 203, and the first clock signal CLK1 of the low level L may be supplied through the fourth input terminal 204.

The ninth transistor T9 and the twelfth transistor T12 may be turned on or maintained in the turned-on state by the voltage of the first node Q of the high level H.

Since the ninth transistor T9 is turned on or maintained in the turned-on state, the second carry clock signal RCLK2 of the low level H is supplied to the first output terminal 208, so that the first carry signal CR1 may be again outputted at the low level L.

Since the twelfth transistor T12 is turned on or maintained in the turned-on state, the first clock signal CLK1 of the low level L is supplied to the second output terminal 209, so that the first output signal OUT1 may be again outputted at the low level L.

The voltage of the node connected to the second electrode of the first capacitor C1 and corresponding to the first output terminal 208 may be changed from the existing high level H to the low level L. The voltage of the first node Q may be again lowered from the existing 2-high level 2H to the high level H by the coupling of the first capacitor C1.

At the fifth time point t5, the start pulse SP supplied through the first input terminal 201 may transition from the high level H to the low level L.

At the sixth time point t6, since the first carry clock signal RCLK1 of the high level H (or gate-on level) is supplied through the second input terminal 202, the first transistor T1 may be turned on.

When the first transistor T1 is turned on, the low level L of the start pulse SP may be supplied to the first node Q. Accordingly, the voltage of the first node Q may transition from the high level H to the low level L.

By the voltage of the low level L of the first node Q, the ninth and twelfth transistors T9 and T12 may be turned off.

The second to fifth transistors T2 to T5 may be turned off by the voltage of the low level L of the first node Q. Here, since the second and third transistors T2 and T3 are turned off, the voltage of the second power source VGL2 of the low level L may be blocked from being supplied to the second node QB_A.

By the first node control signal GBI1 of the high level H, the fifteenth and sixteenth transistors T15 and T16 are turned on or maintained in the turned-on state, so that the voltage of the second node QB_A may be changed from the low level L to the high level H.

The tenth transistor T10 and the thirteenth transistor T13 may be turned on by the voltage of the high level H of the second node QB_A.

Since the tenth transistor T10 is turned on, the voltage of the second power source VGL2 of the low level L is supplied to the first output terminal 208, so that the first carry signal CR1 may be outputted at the low level L.

Since the thirteenth transistor T13 is turned on, the voltage of the first power source VGL1 of the low level L is supplied to the second output terminal 209, so that the first output signal OUT may be outputted at the low level L.

Regarding the operation of the first stage ST1 included in the scan driver 200 in the self-scan period SSP, referring to FIG. 5B, the start pulse SP may be maintained at the low level L in the self-scan period SSP of one frame.

During the self-scan period SSP of one frame, the first clock signal CLK1 and the second clock signal CLK2 may be maintained at a constant level. The first clock signal CLK1 and the second clock signal CLK2 may be maintained at the low level L.

During the self-scan period SSP of one frame, the first carry clock signal RCLK1 and the second carry clock signal RCLK2 may be maintained at a constant level. The first carry clock signal RCLK1 and the second carry clock signal RCLK2 may be maintained at the high level H.

Since the first carry clock signal RCLK1 and the second carry clock signal RCLK2 are maintained at the high level H, the first transistor T1 may be maintained in the turn-on state. Since the low level L of the start pulse SP is supplied to the first node Q, the voltage of the first node Q may be maintained at the low level L during the self-scan period SSP of one frame.

Since the voltage of the first node Q is maintained at the low level L, the ninth transistor T9 and the twelfth transistor T12 may be maintained in the turned-off state. Since the voltage of the first node Q is maintained at the low level L, the second to fifth transistors T2 to T5 may be maintained in the turned-off state.

Since the voltage of the second node QB_A is maintained at the high level H by the first node control signal GBI1 maintained at the high level H, the tenth transistor T10 and the thirteenth transistor T13 may be maintained in the turn-on state.

Since the tenth transistor T10 is maintained in the turned-on state, the voltage of the second power source VGL2 of the low level L is supplied to the first output terminal 208, so that the first carry signal CR1 outputted through the first output terminal 208 may be maintained at the low level L.

Since the thirteenth transistor T13 is maintained in the turned-on state, the voltage of the first power source VGL1 of the low level L is supplied to the second output terminal 209, so that the first output signal OUT1 outputted to the second output terminal 209 may be maintained at the low level L.

The display device 1000 (refer to FIG. 1) (or the scan driver 200) may maintain the clock signals CLK1 and CLK2 and the carry clock signals RCLK1 and RCLK2 at constant signal levels in the self-scan period SSP, in which the scan signals (or output signals (OUT1, OUT2, OUT3, etc.) outputted from the scan driver 200 are maintained at the gate-off level (or the low level L), so that power consumption for transitioning (or clocking) the signal levels of the clock signals CLK1 and CLK2 and the signal levels of the carry clock signals RCLK1 and RCLK2 at a predetermined period may be advantageously minimized.

FIG. 6A illustrates a timing diagram of driving of the first stage of FIG. 3 in the display scan period. FIG. 6B illustrates a timing diagram of driving of the first stage of FIG. 3 in the self-scan period.

Referring to FIG. 1 to FIG. 3, FIG. 6A, and FIG. 6B, FIG. 6A illustrates a timing diagram of signals in a display scan period DSP_1, and FIG. 6B illustrates a timing diagram of signals in a self-scan period SSP_1.

In FIG. 6A and FIG. 6B, except that the first node control signal GBI1 is maintained at the low level L and that the second node control signal GBI2 is maintained at the high level H, the timing diagram of the signals in the display scan period DSP_1 of FIG. 6A and the timing diagram of the signals in the self-scan period SSP_1 of FIG. 6B are substantially the same as or similar to the timing diagram of the signals in the display scan period DSP of FIG. 5A and the timing diagram of the signals in the self-scan period SSP of FIG. 5B, respectively.

During the corresponding frame (for example, the display scan period DSP_1 and the self-scan period SSP_1), the first node control signal GBI1 may be maintained at the low level L, and the second node control signal GBI2 may be maintained at the high level H. The first node control signal GBI1 and the second node control signal GBI2 may have opposite signal levels.

Regarding the operation of the first stage ST1 included in the scan driver 200 in the display scan period DSP_1, referring to FIG. 1 to FIG. 3 and FIG. 6A, the second node control signal GBI2 is maintained at the high level H, so that the seventeenth transistor T17 may be turned on or maintained in the turned-on state. Accordingly, the second node control signal GBI2 of the high level H is provided to the second control node N2, so that the eighteenth transistor T18 may be turned on or maintained in the turned-on state. Since the second node control signal GBI2 of the high level H is provided to the third node QB_B, the voltage of the third node QB_B may have the high level H in a period before the seventh time point t7.

Unlike the second node control signal GBI2, since the first node control signal GBI1 is maintained at the low level L, the fifteenth transistor T15 and the sixteenth transistor T16 may be turned off or maintained in the turned-off state. Accordingly, the second node QB_A may be maintained at the low level L.

At the seventh time point t7, the start pulse SP supplied through the first input terminal 201 may transition from the low level L to the high level H.

At the eighth time point t8, the first carry clock signal RCLK1 of the high level H (or gate-on level) is supplied through the second input terminal 202, so that the first transistor T1 is turned on, and the voltage of the first node Q may transition from the low level L to the high level H by the start pulse SP of the high level H.

The second to fifth transistors T2 to T5 are turned on by the voltage of the high level H of the first node Q, so that the voltage of the second node QB_A may transition from the high level H to the low level L.

At the ninth time point t9, the second carry clock signal RCLK2 of the high level H may be supplied through the third input terminal 203, and the first clock signal CLK1 of the high level H may be supplied through the fourth input terminal 204.

The ninth transistor T9 and the twelfth transistor T12 may be turned on or maintained in the turned-on state by the voltage of the first node Q of the high level H.

Since the ninth transistor T9 and the twelfth transistor T12 are turned on or maintained in the turned-on state, the first carry signal CR1 and the first output signal OUT1 may each be outputted at the high level H.

At the tenth time point t10, the second carry clock signal RCLK2 of the low level L may be supplied through the third input terminal 203, and the first clock signal CLK1 of the low level L may be supplied through the fourth input terminal 204.

Since the ninth transistor T9 and the twelfth transistor T12 are turned on or maintained in the turned-on state by the voltage of the first node Q of the high level H, the first carry signal CR1 and the first output signal OUT1 may each be outputted at the low level L.

At the eleventh time point t11, the start pulse SP supplied through the first input terminal 201 may transition from the high level H to the low level L.

At the twelfth time point t12, since the first carry clock signal RCLK1 of the high level H (or gate-on level) is supplied through the second input terminal 202, the first transistor T1 may be turned on.

When the first transistor T1 is turned on, the low level L of the start pulse SP is supplied to the first node Q, so that since the voltage of the first node Q transitions from the high level H to the low level L, the ninth and twelfth transistors T9 and T12 may be turned off.

By the voltage of the low level L of the first node Q, the second to fifth transistors T2 to T5 are turned off, and by the second node control signal GBI2 of the high level H, since the seventeenth and eighteenth transistors T17 and T18 are turned on or maintained in the turned-on state, the voltage of the third node QB_B may be changed from the low level L to the high level H.

The eleventh transistor T11 and the fourteenth transistor T14 may be turned on by the voltage of the high level H of the third node QB_B.

Since the eleventh transistor T11 is turned on, the voltage of the second power source VGL2 of the low level L is supplied to the first output terminal 208, so that the first carry signal CR1 may be outputted at the low level L.

Since the fourteenth transistor T14 is turned on, the voltage of the first power source VGL1 of the low level L is supplied to the second output terminal 209, so that the first output signal OUT may be outputted at the low level L.

Regarding the operation of the first stage ST1 included in the scan driver 200 in the self-scan period SSP_1, referring to FIG. 6B, the start pulse SP may be maintained at the low level L in the self-scan period SSP_1 of one frame.

During the self-scan period SSP_1 of one frame, the first clock signal CLK1 and the second clock signal CLK2 may be maintained at a constant level, and the first carry clock signal RCLK1 and the second carry clock signal RCLK2 may be maintained at a constant level. The first clock signal CLK1 and the second clock signal CLK2 may be maintained at the low level L, and the first carry clock signal RCLK1 and the second carry clock signal RCLK2 may be maintained at the high level H.

Since the first carry clock signal RCLK1 and the second carry clock signal RCLK2 are maintained at the high level H, the first transistor T1 is maintained in the turned-on state, so that during the self-scan period SSP_1 of one frame, the voltage of the first node Q may be maintained at the low level L.

Since the voltage of the first node Q is maintained at the low level L, the second to fifth transistors T2 to T5, the ninth transistor T9, and the twelfth transistor T12 may be maintained in the turned-off state.

Since the voltage of the third node QB_B is maintained at the high level H by the second node control signal GBI2 maintained at the high level H, the eleventh transistor T11 and the fourteenth transistor T14 may be maintained in the turn-on state.

Since the eleventh transistor T11 is maintained in the turned-on state, the voltage of the second power source VGL2 of the low level L is supplied to the first output terminal 208, so that the first carry signal CR1 outputted through the first output terminal 208 may be maintained at the low level L.

Since the fourteenth transistor T14 is maintained in the turned-on state, the voltage of the first power source VGL1 of the low level L is supplied to the second output terminal 209, so that the first output signal OUT outputted to the second output terminal 209 may be maintained at the low level L.

The signal level of the first node control signal GBI1 and the signal level of the second node control signal GBI2 may vary at a constant period. The signal level of the first node control signal GBI1 and the signal level of the second node control signal GBI2 may vary in units of one frame. The signal level of the first node control signal GBI1 and the signal level of the second node control signal GBI2 may vary in units of two or more frames. The signal level of the first node control signal GBI1 and the signal level of the second node control signal GBI2 may vary in units of one horizontal line (for example, 1 horizontal period 1H).

Figure 7A:
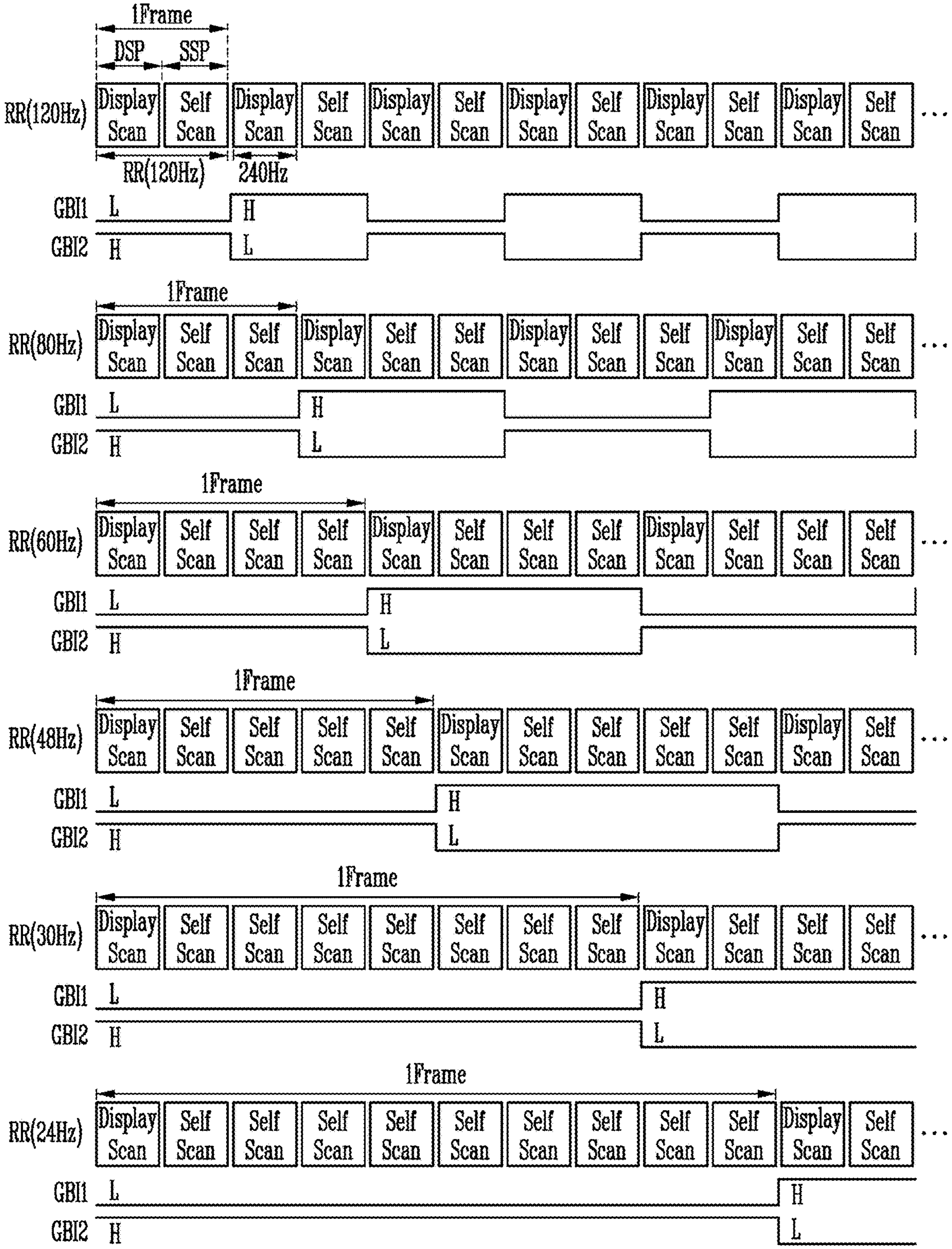
FIG. 7A and FIG. 7B are drawings for explaining a driving method of a display device and a scan driver according to an image refresh rate according to embodiments.
Figure 7B:
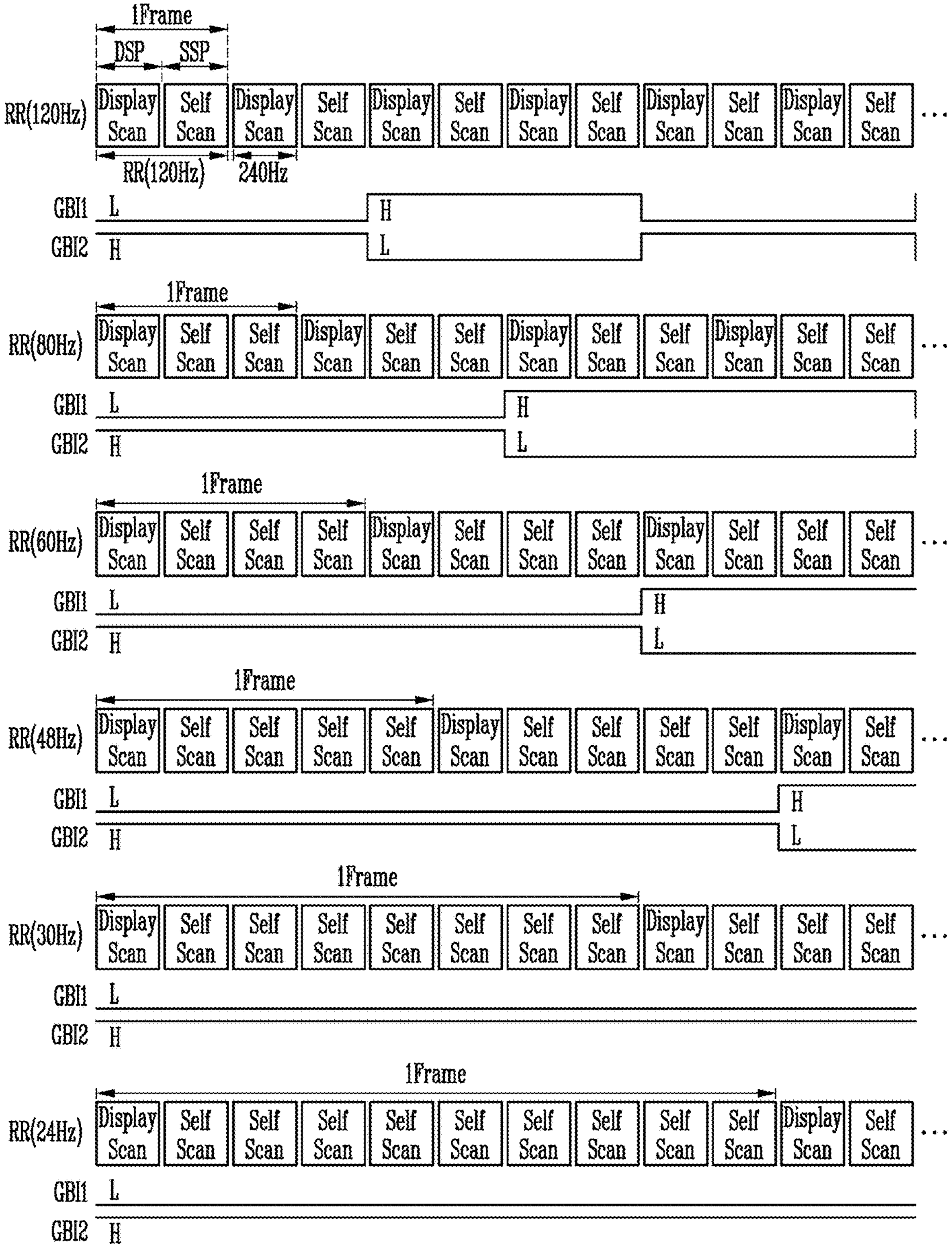

FIGS. 7A and 7B are drawings for explaining a driving method of a display device and a scan driver according to an image refresh rate.

Referring to FIG. 1, FIG. 2, FIG. 3, FIG. 5A, FIG. 5B, FIG. 6A, FIG. 6B, and FIG. 7A, the scan driver 200 (or the stages of the scan driver 200) may perform the operation of the scan driver 200 (or the stages of the scan driver 200) described with reference to FIG. 5A or FIG. 6A in the display scan period DSP, and may perform the operation of the scan driver 200 (or the stages of the scan driver 200) described with reference to FIG. 5B or FIG. 6B in the self-scan period SSP.

Output frequencies of the scan signals outputted through the scan lines SL1 to SLn may vary according to an image refresh rate RR. Each of the scan signals may be output at the same frequency (second frequency) as the image refresh rate RR.

Lengths of the display scan period DSP and the self-scan period SSP may be substantially the same. The number of the self-scan periods SSP included in one frame may be determined according to the image refresh rate RR.

As shown in FIG. 7A, when the display device 1000 is driven at the image refresh rate RR of 120 Hz, one frame period may include one display scan period DSP and one self-scan period SSP. Accordingly, when the display device 1000 (see FIG. 1) is driven at the image refresh rate RR of 120 Hz, during one frame period, the pixels PX (see FIG. 1) may alternately emit light and non-emit light and may repeat two times.

When the display device 1000 is driven at the image refresh rate RR of 80 Hz, one frame period may include one display scan period DSP and two consecutive self-scan periods SSP. Accordingly, when the display device 1000 is driven at the image refresh rate RR of 80 Hz, during one frame period, the pixels PX may alternately emit light and non-emit light and may repeat three times.

The display device 1000 may be driven at a driving frequency of 60 Hz, 48 Hz, 30 Hz, 24 Hz, 20 Hz, 1 Hz, or the like by adjusting the number of the self-scan periods SSP included in one frame period.

The signal level of the first node control signal GBI1 and the signal level of the second node control signal GBI2 may each vary in units of frames. As shown in FIG. 7A, the first node control signal GBI1 may be maintained at the high level H for one frame, and the signal level of the first node control signal GBI1 may be changed and transitioned to the low level L in a next frame of the corresponding frame. The second node control signal GBI2 may be maintained at the low level L for one frame, and the signal level of the second node control signal GBI2 may be changed and transitioned to the high level H in a next frame of the corresponding frame.

As described above with reference to FIG. 1 to FIG. 3 and FIG. 5A to FIG. 6B, the voltage of the second node QB_A and the voltage of the third node QB_B of each of the stages of the scan driver 200 may be controlled, in response to the signal level of the first node control signal GBI1 and the signal level of the second node control signal GBI2.

As described with reference to FIG. 3, since the signal level of the first node control signal GBI1 and the signal level of the second node control signal GBI2 vary in units of frames, one of the second node QB_A and the third node QB_B is maintained at the low level L in the corresponding frame, so that reliability of the transistors (the transistors performing a pull-down function) included in the output circuits 14 and 15 of each stage may be satisfactory.

FIG. 7A illustrates that the signal level of the first node control signal GBI1 and the signal level of the second node control signal GBI2 are varied in units of one frame.

Referring further to FIG. 7B, the signal level of the first node control signal GBI1 and the signal level of the second node control signal GBI2 may be varied in units of two or more frames.

Figure 8:
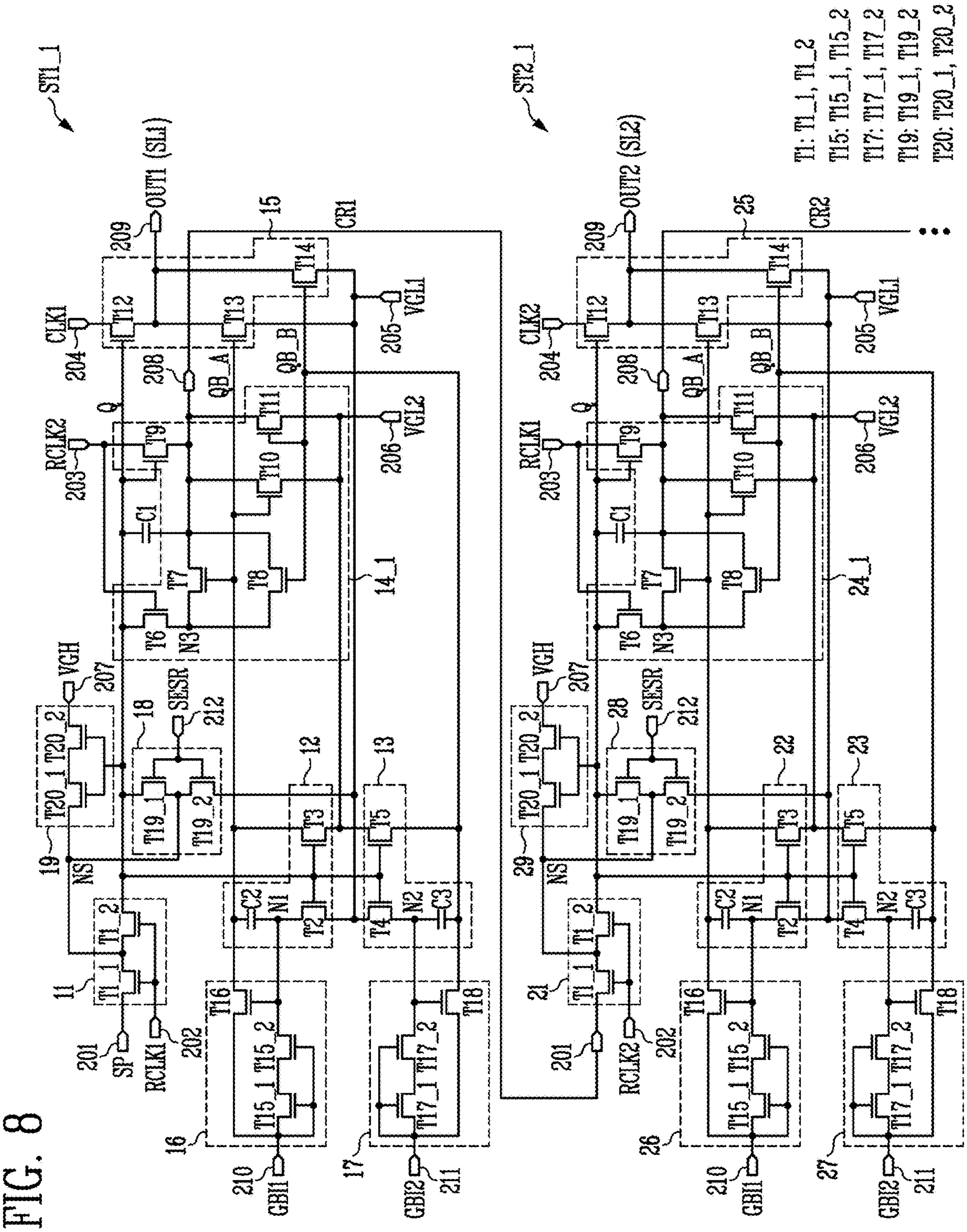
FIG. 8 illustrates a circuit diagram of a first stage and a second stage included in the scan driver of FIG. 2 according to embodiments.

FIG. 8 illustrates a circuit diagram of a first stage and a second stage included in the scan driver of FIG. 2. Some features associated with FIG. 8 may be identical to or analogous to some features described with reference to one or more of FIGS. 1 to 7B.

A first stage ST1_1 and a second stage ST2_1 shown in FIG. 8 represent modified examples of the first stage ST1 and the second stage ST2 (described with reference to FIG. 3), respectively.

Referring to FIG. 3 and FIG. 8, the first stage ST1_1 and the second stage ST2_1 may respectively include input circuits 11 and 21, first control circuits 12 and 22, second control circuits 13 and 23, first output circuits 14_1 and 24_1, second output circuits 15 and 25, a first capacitor C1, third control circuits 16 and 26, and fourth control circuit 17 and 27, initialization circuit 18 and 28, and stabilization circuits 19 and 29.

The first output circuits 14_1 and 24_1 may include the sixth to eleventh transistors T6 to T11. According to the circuit layouts of the first stage ST1_1 and the second stage ST2_1, when the parasitic capacitance between the node corresponding to the first output terminal 208 and the node corresponding to the second power input terminal 206 is sufficient, the fourth capacitor C4 (refer to FIG. 3) may be optional in the first output circuits 14_1 and 24_1.

Figure 9:
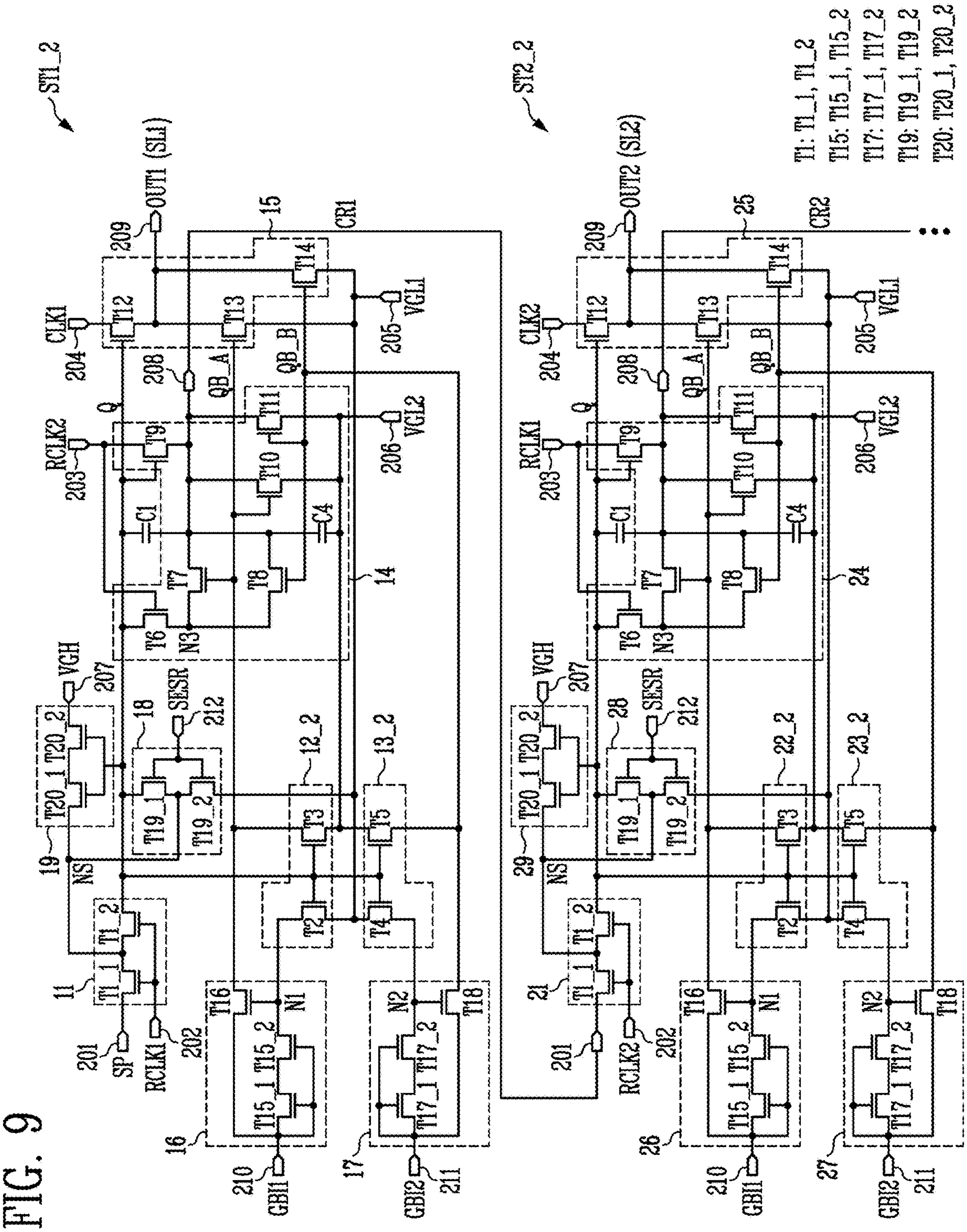
FIG. 9 illustrates a circuit diagram of a first stage and a second stage included in the scan driver of FIG. 2 according to embodiments.

FIG. 9 illustrates a circuit diagram of a first stage and a second stage included in the scan driver of FIG. 2. Some features associated with FIG. 9 may be identical to or analogous to some features described with reference to one or more of FIGS. 1 to 8.

A first stage ST1_2 and a second stage ST2_2 shown in FIG. 9 represent modified examples of the first stage ST1 and the second stage ST2 (described with reference to FIG. 3), respectively.

Referring to FIG. 3 and FIG. 9, the first stage ST1_2 and the second stage ST2_2 may respectively include input circuits 11 and 21, first control circuits 12_2 and 22_2, second control circuits 13_2 and 23_2, first output circuits 14 and 24, second output circuits 15 and 25, a first capacitor C1, third control circuits 16 and 26, and fourth control circuit 17 and 27, initialization circuit 18 and 28, and stabilization circuits 19 and 29.

The first control circuits 12_2 and 22_2 may include the second and third transistors T2 and T3. According to the circuit layouts of the first stage ST1_2 and the second stage ST2_2, when the parasitic capacitance between the first control node N1 and the second node QB_A is sufficient, the second capacitor C2 (refer to FIG. 3) may be optional in the first control circuits 12_2 and 22_2.

The second control circuits 13_2 and 23_2 may include the fourth and fifth transistors T4 and T5. That is, according to the circuit layouts of the first stage ST1_2 and the second stage ST2_2, when the parasitic capacitance between the second control node N2 and the third node QB_B is sufficient, the third capacitor C3 (refer to FIG. 3) may be optional in the second control circuits 13_2 and 23_2.

Figure 10:
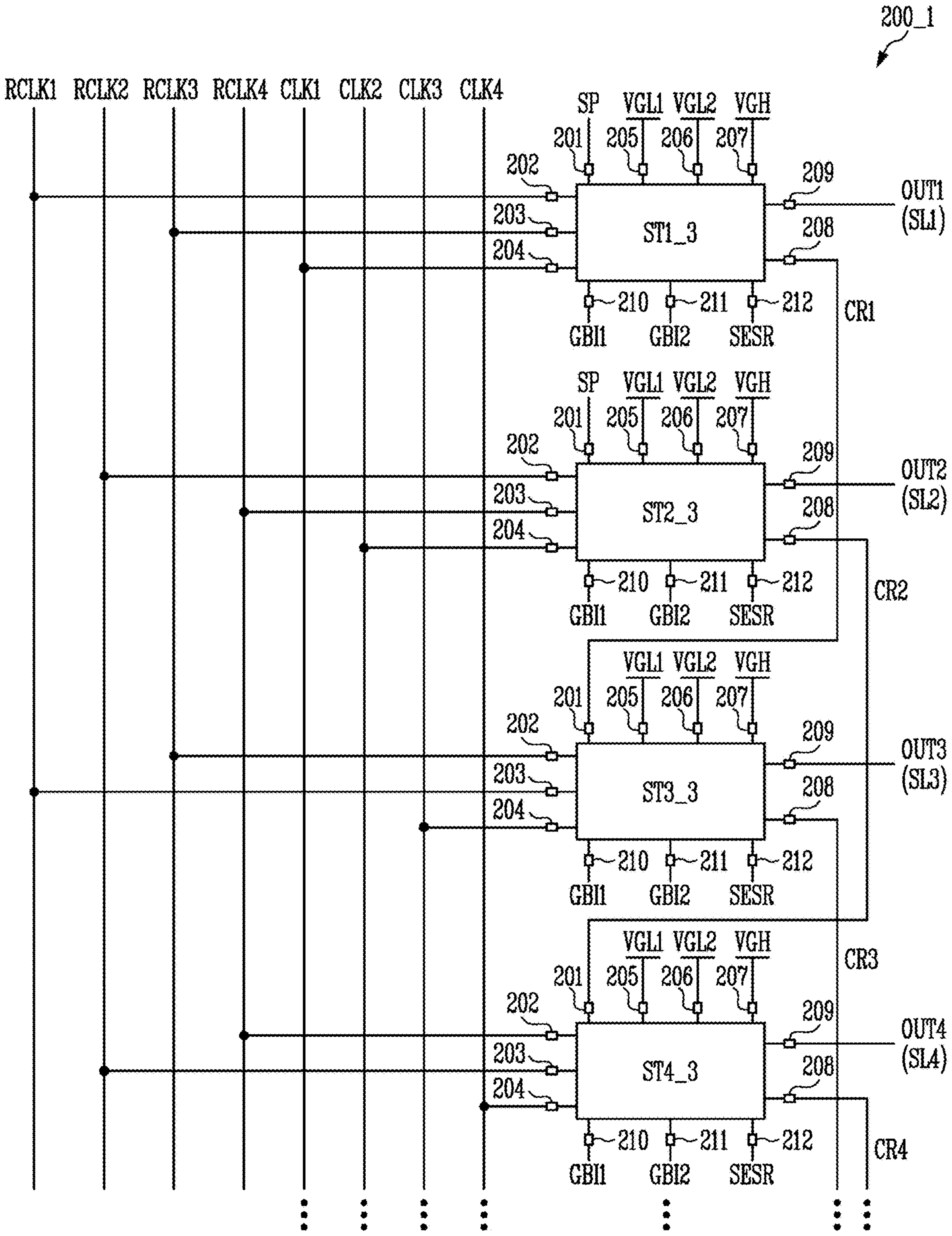
FIG. 10 illustrates a block diagram of a scan driver (a gate driver) according to embodiments.

FIG. 10 illustrates a block diagram of a scan driver (a gate driver) according to embodiments.

Some features associated with FIG. 10 may be identical to or analogous to some features described with reference to one or more of FIGS. 1 to 9.

A scan driver 200_1 shown in FIG. 10 represents a modified example of the scan driver 200 described with reference to FIG. 2.

Referring to FIG. 1, FIG. 2, and FIG. 10, the scan driver 200_1 may include stages ST1_3 to ST4_3. The stages ST1_3 to ST4_3 may be respectively connected to the corresponding scan lines SL1 to SL4, and may output a scan signal in response to clock signals CLK1, CLK2, CLK3, and CLK4 and carry clock signals RCLK1, RCLK2, RCLK3, and RCLK4.

The third stage ST3_3 may be dependent on the first stage ST1_3, and the fourth stage ST4_3 may be dependent on the second stage ST2_3. The first to fourth stages ST1_3 to ST4_3 may have substantially the same configuration.

Each of the stages ST1_3 to ST4_3 may include a first input terminal 201, a second input terminal 202, a third input terminal 203, a fourth input terminal 204, a first power input terminal 205, a second power input terminal 206, a third power input terminal 207, a first output terminal 208, and a second output terminal 209.

Each of the stages ST1_3 to ST4_3 may further include a fifth input terminal 210, a sixth input terminal 211, and a seventh input terminal 212.

The first input terminal 201 of each of the first stage ST1_3 and the second stage ST2_3 may receive the start pulse SP. The first input terminal 201 of an i-th stage (wherein i is an integer greater than or equal to 3) may receive the carry signal outputted from the first output terminal 208 of an (i−2)-th stage. The first input terminal 201 of the third stage ST3_3 may receive the first carry signal CR1 outputted from the first output terminal 208 of the first stage ST1_3, and the first input terminal 201 of the fourth stage ST4_3 may receive the second carry signal CR2 outputted from the first output terminal 208 of the second stage ST2_3.

The first carry clock signal RCLK1 and the third carry clock signal RCLK3 may be alternately provided to the second input terminal 202 and the third input terminal 203 of a (2h−1)-th stages (wherein h is an integer greater than 0) among stages ST1_3 to ST4_3. The second input terminal 202 of the first stage ST1_3 may receive the first carry clock signal RCLK1, and the third input terminal 203 of the first stage ST1_3 may receive the third carry clock signal RCLK3. The second input terminal 202 of the third stage ST3_3 may receive the third carry clock signal RCLK3, and the third input terminal 203 of the third stage ST3_3 may receive the first carry clock signal RCLK1.

The first carry clock signal RCLK1 and the third carry clock signal RCLK3 may be alternately provided to the second input terminal 202 and the third input terminal 203 of a (2h−1)-th stages (wherein h is an integer greater than 0) among stages ST1_3 to ST4_3. The second input terminal 202 of the first stage ST1_3 may receive the first carry clock signal RCLK1, and the third input terminal 203 of the first stage ST1_3 may receive the third carry clock signal RCLK3. The second input terminal 202 of the third stage ST3_3 may receive the third carry clock signal RCLK3, and the third input terminal 203 of the third stage ST3_3 may receive the first carry clock signal RCLK1. The second input terminal 202 of the first stage ST1_3 may receive the third carry clock signal RCLK3, the third input terminal 203 of the first stage ST1_3 may receive the first carry clock signal RCLK1, the second input terminal 202 of the third stage ST3_3 may receive the first carry clock signal RCLK1, and the third input terminal 203 of the third stage ST3_3 may receive the third carry clock signal RCLK3.

The second carry clock signal RCLK2 and the fourth carry clock signal RCLK4 may be alternately provided to the second input terminal 202 and the third input terminal 203 of the 2h-th stages among the stages ST1_3 to ST4_3. The second input terminal 202 of the second stage ST2_3 may receive the second carry clock signal RCLK2, and the third input terminal 203 of the second stage ST2_3 may receive the fourth carry clock signal RCLK4. The second input terminal 202 of the fourth stage ST4_3 may receive the fourth carry clock signal RCLK4, and the third input terminal 203 of the fourth stage ST4_3 may receive the second carry clock signal RCLK2. The second input terminal 202 of the second stage ST2_3 may receive the fourth carry clock signal RCLK4, the third input terminal 203 of the second stage ST2_3 may receive the second carry clock signal RCLK2, the second input terminal 202 of the fourth stage ST4_3 may receive the second carry clock signal RCLK2, and the third input terminal 203 of the fourth stage ST4_3 may receive the fourth carry clock signal RCLK4.

The carry clock signals RCLK1, RCLK2, RCLK3, and RCLK4 have the same period in the display scan period, and may have waveforms having phases that partially overlap. For example, in the display scan period, the second carry clock signal RCLK2 may be shifted by about ¼ period from the first carry clock signal RCLK1, the third carry clock signal RCLK3 may be shifted by about ¼ period from the second carry clock signal RCLK2, and the fourth carry clock signal RCLK4 may be shifted by about ¼ period from the third carry clock signal RCLK3.

The carry clock signals RCLK1, RCLK2, RCLK3, and RCLK4 may be maintained constant in the self-scan period. For example, in the self-scan period, the carry clock signals RCLK1, RCLK2, RCLK3, and RCLK4 may be maintained at a high level (or high voltage).

The first to fourth clock signals CLK1, CLK2, CLK3, and CLK4 may be sequentially provided to the fourth input terminals 204 of the stages ST1_3 to ST4_3. The fourth input terminal 204 of the first stage ST1_3 may receive the first clock signal CLK1, the fourth input terminal 204 of the second stage ST2_3 may receive the second clock signal CLK2, the fourth input terminal 204 of the third stage ST3_3 may receive the third clock signal CLK3, and the fourth input terminal 204 of the fourth stage ST4_3 may receive the fourth clock signal CLK4.

The clock signals CLK1, CLK2, CLK3, and CLK4 have the same period in the display scan period, and may have waveforms having phases that partially overlap. For example, in the display scan period, the second clock signal CLK2 may be shifted by about ¼ period from the first clock signal CLK1, the third clock signal CLK3 may be shifted by about ¼ period from the second clock signal CLK2, and the fourth clock signal CLK4 may be shifted by about ¼ period from the third clock signal CLK3.

The clock signals CLK1, CLK2, CLK3, and CLK4 may be maintained constant in the self-scan period. For example, in the self-scan period, the clock signals CLK1, CLK2, CLK3, and CLK4 may maintained at a low level (or low voltage).

The (2h−1)-th stages of the stages ST1_3 to ST4_3 included in the scan driver 200_1 may have a substantially equivalent configuration, except for a type of a signal received through the first input terminal 201. The first stage ST1_3 may receive the start pulse SP through the first input terminal 201. The remaining stages (for example, the third stage ST3_3) may receive carry signals through their first input terminals 201 and may have substantially the same circuit configuration and operation as the first stage ST1_3.

The configuration and operation of the (2h−1)-th stages (for example, the first and third stages ST1_3 and ST3_3) connected to each other and included in the scan driver 200_1 of FIG. 10 may be substantially the same as or similar to the configuration and operation of the stages ST1 to ST4 included in the scan driver 200 described with reference to FIG. 2.

The 2h-th stages of the stages ST1_3 to ST4_3 included in the scan driver 200_1 may have a substantially equivalent configuration, except for a type of a signal received through the first input terminal 201. The second stage ST2_3 may receive the start pulse SP through the first input terminal 201. The remaining stages (for example, the fourth stage ST4_3) may receive carry signals through their terminals 201 and may have substantially the same circuit configuration and operation as the second stage ST2_3.

The configuration and operation of the 2h-th stages (for example, the second and fourth stages ST2_3 and ST4_3) connected to each other and included in the scan driver 200_1 of FIG. 10 may be substantially the same as or similar to the configuration and operation of the stages ST1 to ST4 included in the scan driver 200 described with reference to FIG. 3.

Among the stages included in the scan driver 200_1, the (2h−1)-th stages and the 2h-th stages are separately described. The (2h−1)-th stages are represented by for example, the first stage ST1_3. The 2h-th stages are represented by for example, the second stage ST2_3.

Figure 11A:
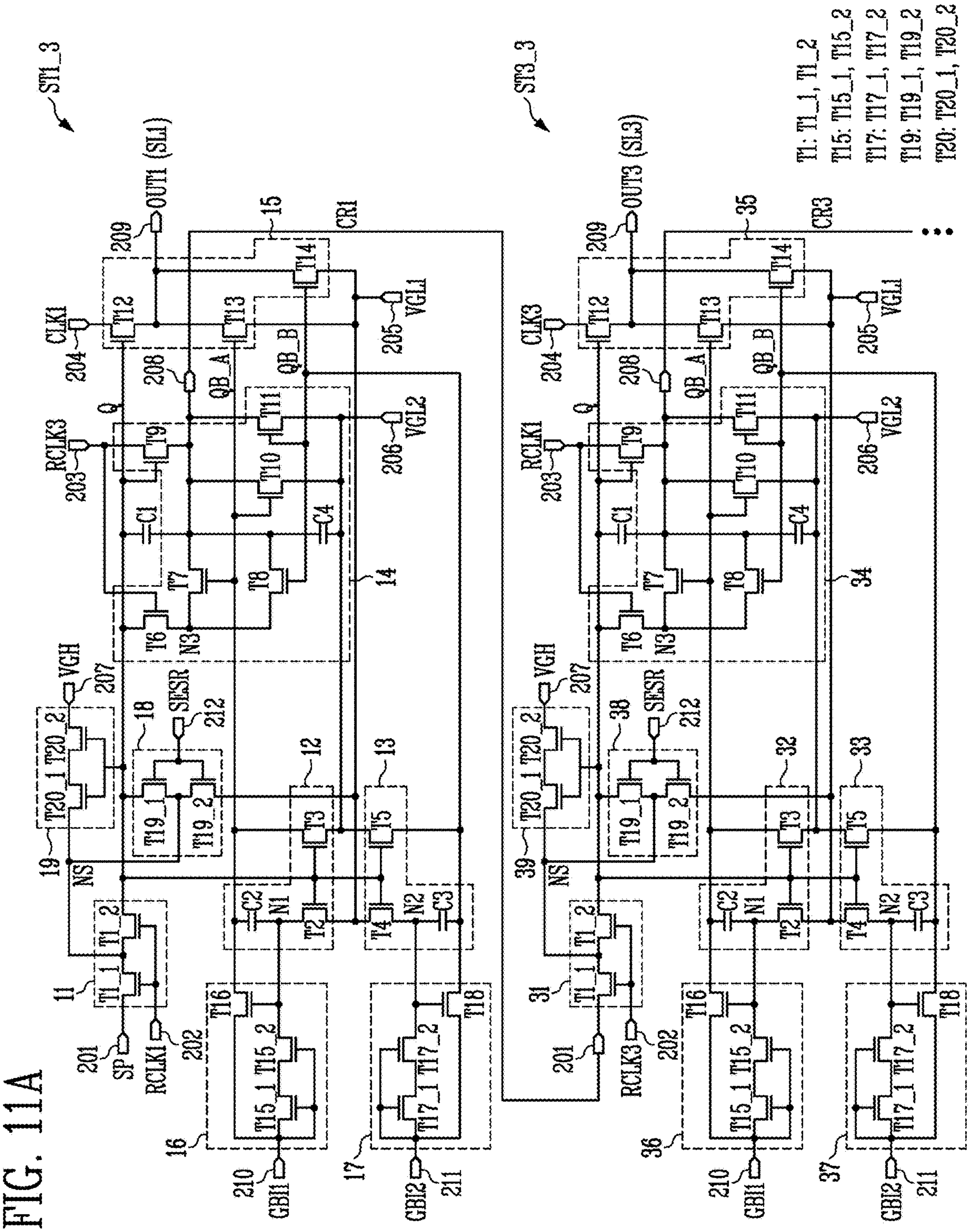
FIG. 11A illustrates a circuit diagram of a first stage and a third stage included in the scan driver of FIG. 10 according to embodiments.
Figure 11B:
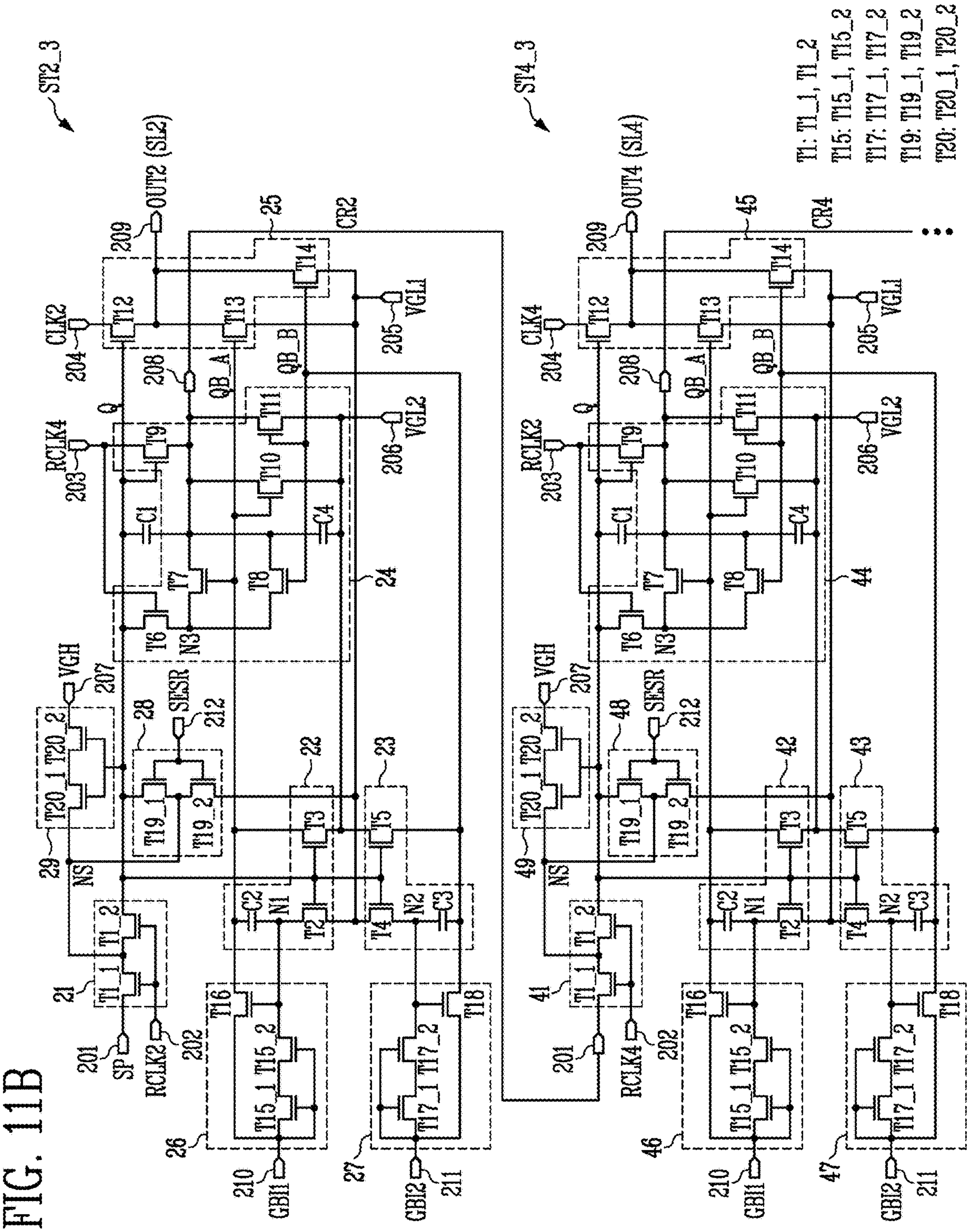
FIG. 11B illustrates a circuit diagram of a second stage and a fourth stage included in the scan driver of FIG. 10 according to embodiments.
Figure 12A:
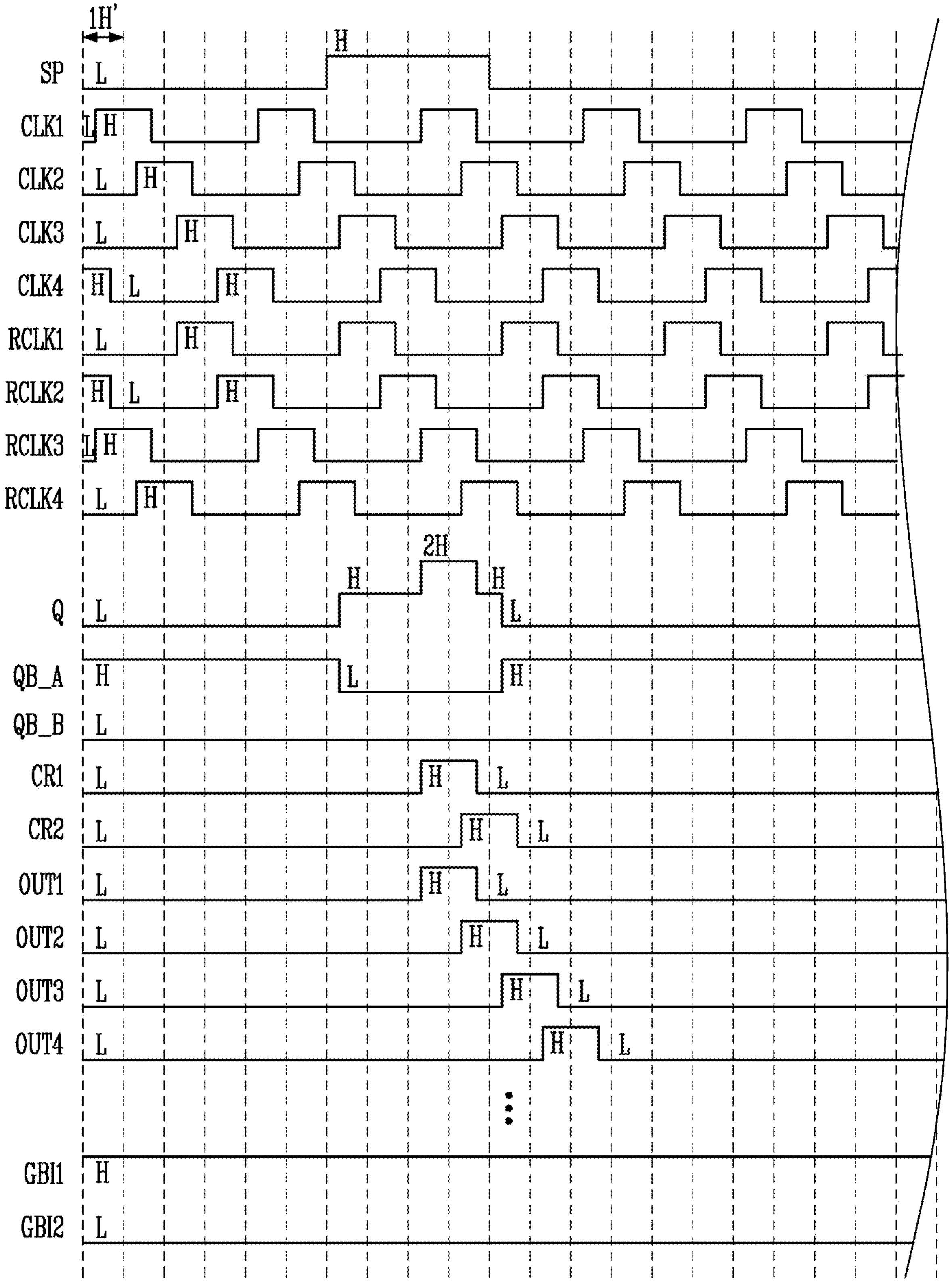
FIG. 12A illustrates a timing diagram of driving of a first stage of FIG. 11A in a display scan period according to embodiments.
Figure 12B:
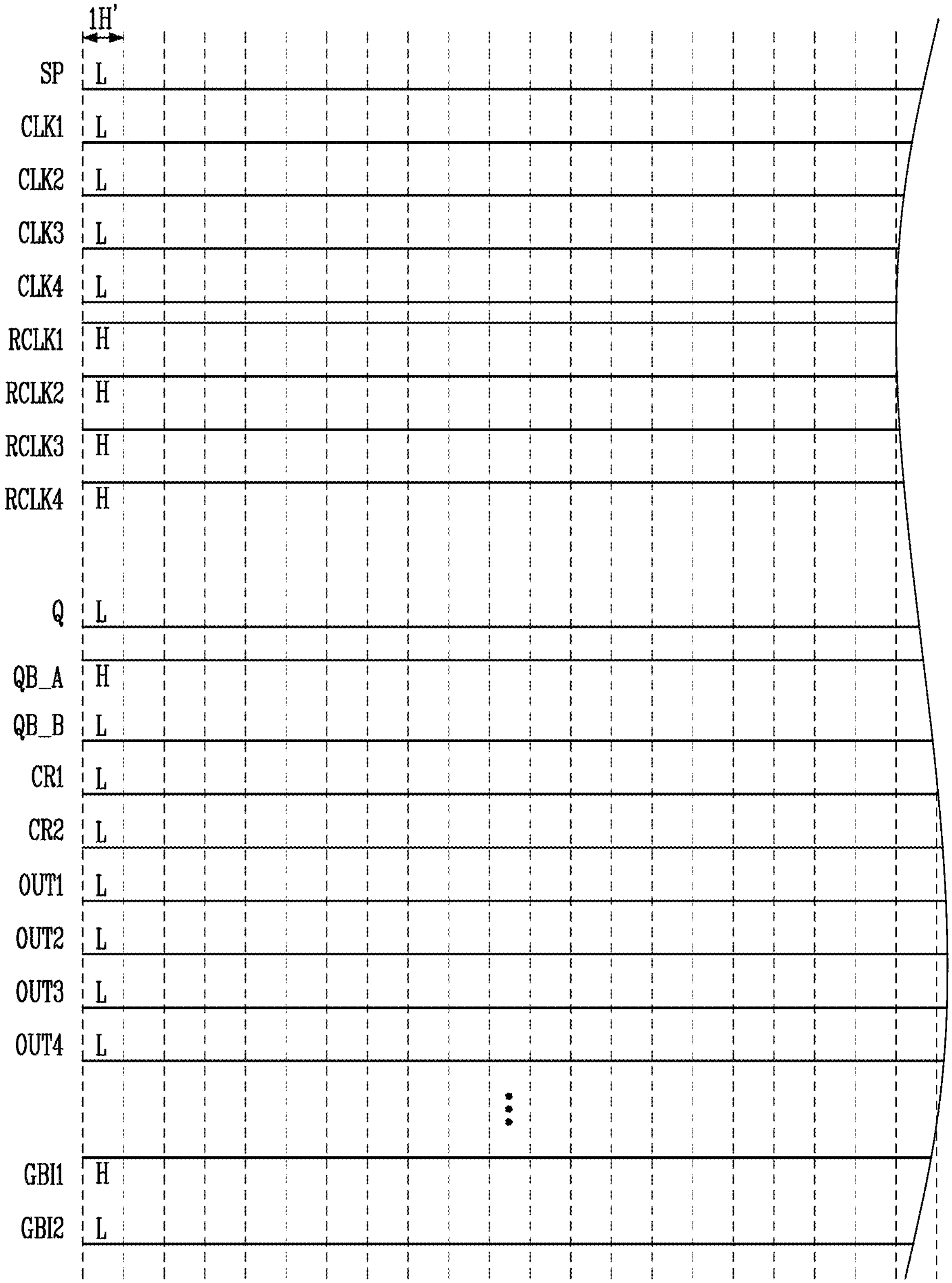
FIG. 12B illustrates a timing diagram of driving of a first stage of FIG. 11A in a self-scan period according to embodiments.

FIG. 11A illustrates a circuit diagram of a first stage and a third stage included in the scan driver of FIG. 10. FIG. 11B illustrates a circuit diagram of a second stage and a fourth stage included in the scan driver of FIG. 10. FIG. 12A illustrates a timing diagram of driving of the first stage of FIG. 11A in the display scan period. FIG. 12B illustrates a timing diagram of driving of the first stage of FIG. 11A in the self-scan period.

Some features associated with one or more of FIG. 11A, FIG. 11B, FIG. 12A, and FIG. 12B may be identical to or analogous to some features described with reference to one or more of FIGS. 1 to 10.

Regarding the (2h−1)-th stages connected to each other among the stages included in the scan driver 200_1 (see FIG. 10), referring to FIG. 3 and FIG. 11A, the first stage ST1_3 and the third stage ST3_3 respectively include input circuits 11 and 31, first control circuits 12 and 32, second control circuits 13 and 33, first output circuits 14 and 34, second output circuits 15 and 35, a first capacitor C1, third control circuits 16 and 36, fourth control circuits 17 and 37, initialization circuits 18 and 38, and stabilization circuit 19 and 39.

The first stage ST1_3 may generate and output the first carry signal CR1 and the first output signal OUT1 (or the first scan signal) based on the input signal (for example, the start pulse SP), the first carry clock signal RCLK1, the third carry clock signal RCLK3, the first clock signal CLK1, the first node control signal GBI1, the second node control signal GBI2, the voltage of the first power source VGL1, the voltage of the second power source VGL2, and the voltage of the third power source VGH.

The third stage ST3_3 may generate and output the third carry signal CR3 and the third output signal OUT3 (or the third scan signal) based on the input signal (for example, the first carry signal CR1 outputted from the first stage ST1_3), the first carry clock signal RCLK1, the third carry clock signal RCLK3, the third clock signal CLK3, the first node control signal GBI1, the second node control signal GBI2, the voltage of the first power source VGL1, the voltage of the second power source VGL2, and the voltage of the third power source VGH.

Except for the signals (for example, the first carry clock signal RCLK1, the third carry clock signal RCLK3, the first clock signal CLK1, and the third clock signal CLK3) provided to the second to fourth input terminals 202, 203, and 204 of the first stage ST1_3 and the third stage ST3_3, the configuration and operation of each of the first stage ST1_3 and the third stage ST3_3 shown in FIG. 11A are substantially the same as or similar to the configuration and operation of each of the first stage ST1 and the second stage ST2 described with reference to FIG. 3.

Regarding the 2h-th stages connected to each other among the stages included in the scan driver 200_1 (see FIG. 10), referring to FIG. 3 and FIG. 11B, the second stage ST2_3 and the fourth stage ST4_3 respectively include input circuits 21 and 41, first control circuits 22 and 42, second control circuits 23 and 43, first output circuits 24 and 44, second output circuits 25 and 45, a first capacitor C1, third control circuits 26 and 46, fourth control circuits 27 and 47, initialization circuits 28 and 48, and stabilization circuit 29 and 49.

The second stage ST2_3 may generate and output the second carry signal CR2 and the second output signal OUT2 (or the second scan signal) based on the input signal (for example, the start pulse SP), the second carry clock signal RCLK2, the fourth carry clock signal RCLK4, the second clock signal CLK2, the first node control signal GBI1, the second node control signal GBI2, the voltage of the first power source VGL1, the voltage of the second power source VGL2, and the voltage of the third power source VGH.

The fourth stage ST4_3 may generate and output the fourth carry signal CR4 and the fourth output signal OUT4 (or the fourth scan signal) based on the input signal (for example, the second carry signal CR2 outputted from the second stage ST2_3), the second carry clock signal RCLK2, the fourth carry clock signal RCLK4, the fourth clock signal CLK4, the first node control signal GBI1, the second node control signal GBI2, the voltage of the first power source VGL1, the voltage of the second power source VGL2, and the voltage of the third power source VGH.

Except for the signals (for example, the second carry clock signal RCLK2, the fourth carry clock signal RCLK4, the second clock signal CLK2, and the fourth clock signal CLK4) provided to the second to fourth input terminals 202, 203, and 204 of the second stage ST2_3 and the fourth stage ST4_3, the configuration and operation of each of the second stage ST2_3 and the fourth stage ST4_3 shown in FIG. 11B are substantially the same as or similar to the configuration and operation of each of the first stage ST1 and the second stage ST2 described with reference to FIG. 3.

Referring to FIG. 12A and FIG. 12B, FIG. 12A and FIG. 12B illustrate the scan signals (or the output signals OUT1, OUT2, OUT3, OUT4, etc.) outputted through the scan lines SL1 to SLn (see FIG. 1) to be supplied to the pixels PX (see FIG. 1). As described above with reference to FIG. 10, the scan driver 200_1 may supply scan signals including a gate-on level pulse to the scan lines SL1 to SLn (see FIG. 1) in the display scan period DSP_2 of one frame.

The scan driver 200_1 (see FIG. 10) may supply scan signals maintained at a gate-off level to the scan lines SL1 to SLn (see FIG. 1) during the self-scan period SSP_2 of one frame.

Regarding the operation of the stages included in scan driver 200_1 in the display scan period DSP_2, referring to FIG. 12A, in the display scan period DSP_2 of one frame, the first to fourth clock signals CLK1, CLK2, CLK3, and CLK4 may be supplied at different times. The second clock signal CLK2 may be shifted by ¼ period (for example, one horizontal period 1H') from the first clock signal CLK1, the third clock signal CLK3 may be shifted by ¼ period (for example, one horizontal period 1H') from the second clock signal CLK2, and the fourth clock signal CLK4 may be shifted by ¼ period (for example, one horizontal period 1H') from the third clock signal CLK3.

In the display scan period DSP_2 of one frame, the first to fourth carry clock signals RCLK1, RCLK2, RCLK3, and RCLK4 may be supplied at different times. The second carry clock signal RCLK2 may be shifted by ¼ period (for example, one horizontal period 1H') from the first carry clock signal RCLK1, the third carry clock signal RCLK3 may be shifted by ¼ period (for example, one horizontal period 1H') from the second carry clock signal RCLK2, and the fourth carry clock signal RCLK4 may be shifted by ¼ period (for example, one horizontal period 1H') from the third carry clock signal RCLK3.

With respect to signals applied to the (2h−1)-th stages (for example, the first stage ST1_3 and the third stage ST3_3), since the first clock signal CLK1 and the third clock signal CLK3 are shifted by half a period from each other, and since the first carry clock signal RCLK1 and the third carry clock signal RCLK3 are shifted by half a period from each other, the operation of the (2h−1)-th stages (for example, the first stage ST1_3 and the third stage ST3_3) outputting the carry signal and the output signal may be substantially the same as the operation of the stages (for example, the first stage ST1 and the second stage ST2 of FIG. 3) described with reference to FIG. 3 and FIG. 5A and outputting the carry signal and the output signal.

With respect to signals applied to the 2h-th stages (for example, the second stage ST2_3 and the fourth stage ST4_3), since the second clock signal CLK2 and the fourth clock signal CLK4 are shifted by half a period from each other, and since the second carry clock signal RCLK2 and the fourth carry clock signal RCLK4 are shifted by half a period from each other, the operation of the 2h-th stages (for example, the second stage ST2_3 and the fourth stage ST4_3) outputting the carry signal and the output signal may be substantially the same as the operation of the stages (for example, the first stage ST1 and the second stage ST2 of FIG. 3) described with reference to FIG. 3 and FIG. 5A and outputting the carry signal and the output signal.

Referring to FIG. 12A, the scan signals (or output signals OUT1, OUT2, OUT3, OUT4, etc.) outputted from the stages ST1_3 to ST4_3 of the scan driver 200_1 (see FIG. 10) in the display scan period DSP_2 may be sequentially outputted, and the pulses of the high level H may partially overlap.

Regarding the operation of the stages included in the scan driver 200_1 in the self-scan period SSP_2, referring to FIG. 12B, during the self-scan period SSP_2 of one frame, the clock signals CLK1, CLK2, CLK3, and CLK4 may be maintained constant. The clock signals CLK1, CLK2, CLK3, and CLK4 may be maintained at the low level L.

The carry clock signals RCLK1, RCLK2, RCLK3, and RCLK4 may be maintained constant during the self-scan period SSP_2 of one frame. The carry clock signals RCLK1, RCLK2, RCLK3, and RCLK4 may be maintained at the high level H.

Accordingly, as described above with reference to FIG. 10 and FIG. 12B, the output signals OUT1 to OUT4 outputted from the stages ST1_3 to ST4_3 of the scan driver 200_1 may be maintained at the low level L.

According to embodiments, in a self-scan period (in which scan signals are outputted at a gate-off level during one frame period), clock signals and carry clock signals may be maintained constant. Accordingly, power consumption for respectively shifting (or clocking) the signal level of the clock signals and the signal level of the carry clock signals at a predetermined period may be advantageously prevented or minimized.

The scan driver according to embodiments may separately drive transistors performing a pull-down function of an output circuit in frame units. Advantageously, the reliability of the transistors performing the pull-down function may be satisfactory.

While example of embodiments have been described, practical embodiments are not limited to the described embodiments. Practical embodiments cover various modifications and equivalent arrangements within the scope of the appended claims.

What is claimed is:

1. A stage comprising:

a first input terminal configured to receive an input signal;

a second input terminal configured to receive a first clock signal;

a third input terminal configured to receive a second clock signal;

a fourth input terminal electrically connected to a first node and configured to receive a third clock signal;

a first output terminal electrically connected to a second node and configured to output a first signal;

a second output terminal configured to output a second signal;

an input circuit controlled in response to a voltage of the second input terminal and electrically connected to the first input terminal;

a pull-up transistor including a gate electrode electrically connected to the first input terminal through the input circuit, and configured to switch an electrical connection between the third input terminal and the first output terminal;

a first pull-down transistor including a gate electrode and configured to switch an electrical connection between the first output terminal and a first power input terminal;

a control circuit controlled in response to a voltage that is output from the input circuit and, configured to switch an electrical connection between the gate electrode of the first pull-down transistor and a third node; and a second pull-down transistor including a gate electrode electrically connected to the third node, and configured to switch an electrical connection between the first output terminal and the first power input terminal.

2. The stage of claim 1, wherein each of the pull-up transistor, the first pull-down transistor, and the second pull-down transistor is an n-type transistor.

3. The stage of claim 1, wherein a first power source is supplied to the first power input terminal, and wherein a voltage of the first power source corresponds to a low level of an output signal.

4. The stage of claim 1, wherein a high level of the second clock signal corresponds to a high level of the second signal.

5. The stage of claim 1, wherein the first clock signal is a first carry clock signal and the third clock signal is a second carry clock signal.

6. The stage of claim 1, wherein the pull-up transistor, the first pull-down transistor, and the second pull-down transistor are included in a second output circuit, wherein the stage further comprises a first output circuit, and wherein the first output circuit comprises:

a pull-up transistor including a gate electrode electrically connected to the first input terminal through the input circuit, and configured to switch an electrical connection between the fourth input terminal and the second output terminal;

a first pull-down transistor including a gate electrode electrically connected to the control circuit, and configured to switch an electrical connection between the second node and a second power input terminal; and a second pull-down transistor including a gate electrode electrically connected to the third node, and configured to switch the electrical connection between the second node and the second power input terminal.

7. The stage of claim 6, wherein each of the pull-up transistor, the first pull-down transistor, and the second pull-down transistor of the first output circuit, and the pull-up transistor, the first pull-down transistor, and the second pull-down transistor of the second output circuit is an n-type transistor.

8. The stage of claim 6, wherein a level of a voltage supplied to the second power input terminal is set to be equal or lower than a level of a voltage supplied to the first power input terminal.

9. The stage of claim 1, wherein the input circuit comprises:

a first sub-transistor including a gate electrode electrically connected to the second input terminal, and configured to switch an electrical connection between the first input terminal and a stabilization node; and a second sub-transistor including a gate electrode electrically connected to the second input terminal, and configured to switch an electrical connection between the stabilization node and the gate electrode of the pull-up transistor.

10. The stage of claim 9, wherein each of the first sub-transistor and the second sub-transistor is an n-type transistor.

11. The stage of claim 9, further comprising a stabilization circuit, wherein the stabilization circuit comprises a gate electrode electrically connected to the input circuit and is configured to switch an electrical connection between a third power input terminal and the stabilization node.

12. The stage of claim 11, wherein the stabilization circuit comprises an n-type transistor.

13. The stage of claim 11, wherein a third power source is supplied to the third power input terminal, and wherein a voltage of the third power source is a turn-on level of the stabilization circuit and the pull-up transistor.

14. The stage of claim 1, wherein, throughout at least a portion of one frame, each of the first clock signal, the second clock signal, and the third clock signal is constant.

15. The stage of claim 1, wherein the input signal is at least one of a start pulse and a carry signal.

16. A scan driver comprising a plurality of stages configured to output an output signal to a corresponding scan line among a plurality of scan lines, wherein one of the plurality of stages comprises:

a first input terminal configured to receive an input signal;

a second input terminal configured to receive a first clock signal;

a third input terminal configured to receive a second clock signal;

a fourth input terminal electrically connected to a first node and configured to receive a third clock signal;

a first output terminal electrically connected to a second node and configured to output a first signal;

a second output terminal configured to output the output signal;

an input circuit controlled in response to a voltage of the second input terminal and electrically connected to the first input terminal;

a pull-up transistor including a gate electrode electrically connected to the first input terminal through the input circuit, and configured to switch an electrical connection between the third input terminal and the first output terminal;

a first pull-down transistor including a gate electrode and configured to switch an electrical connection between the first output terminal and a first power input terminal;

a control circuit controlled in response to a voltage that is output from the input circuit, and configured to switch an electrical connection between the gate electrode of the first pull-down transistor and a third node; and a second pull-down transistor including a gate electrode electrically connected to the third node, and configured to switch the electrical connection between the first output terminal and the first power input terminal.

17. The scan driver of claim 16, wherein each of the plurality of stages comprises a plurality of transistors, and wherein each of the plurality of transistors comprises an oxide semiconductor.

18. The scan driver of claim 16, wherein the one of the plurality of stages outputs the first signal to a next stage.

19. A display device comprising:

a pixel portion including pixels, the pixels being connected to a plurality of data lines and a plurality of scan lines;

a scan driver including a plurality of stages configured to output an output signal to a corresponding one of the plurality of scan lines;

a data driver configured to supply data signals to the plurality of data lines; and a timing controller configured to control the scan driver and the data driver, wherein one of the plurality of stages comprises:

a first input terminal configured to receive an input signal;

a second input terminal configured to receive a first clock signal;

a third input terminal configured to receive a second clock signal;

a fourth input terminal electrically connected to a first node and configured to receive a third clock signal;

a first output terminal electrically connected to a second node and configured to output a first signal;

a second output terminal configured to output the output signal;

an input circuit controlled in response to a voltage of the second input terminal and electrically connected to the first input terminal;

a pull-up transistor including a gate electrode electrically connected to the first input terminal through the input circuit, and configured to switch an electrical connection between the third input terminal and the first output terminal;

a first pull-down transistor including a gate electrode and configured to switch an electrical connection between the first output terminal and a first power input terminal;

a control circuit controlled in response to a voltage that is output from the input circuit, and configured to switch an electrical connection between the gate electrode of the first pull-down transistor and a third node; and a second pull-down transistor including a gate electrode electrically connected to the third node, and configured to switch the electrical connection between the first output terminal and the first power input terminal.

20. The display device of claim 19, wherein, in the pixels, the data signals are written in response to the output signal of a turn-on level supplied to the corresponding one of the plurality of scan lines.

* * * * *